June 30, 1959 J. V. BLANKENBAKER 2,892,587

RESULT-FROM-CARRY ADDER-SUBTRACTERS

Filed Sept. 3, 1953 4 Sheets-Sheet 1

INVENTOR.

JOHN V. BLANKENBAKER,

BY

Seymour M. Rosenberg

HIS ATTORNEY.

RESULT-FROM-CARRY ADDER-SUBTRACTERS

Filed Sept. 3, 1953 4 Sheets-Sheet 2

INVENTOR.
JOHN V. BLANKENBAKER,
BY
Seymour M. Rosenberg
HIS ATTORNEY.

INVENTOR.
JOHN V. BLANKENBAKER
BY Henry Heyman
ATTORNEY.

June 30, 1959 J. V. BLANKENBAKER 2,892,587

RESULT-FROM-CARRY ADDER-SUBTRACTERS

Filed Sept. 3, 1953 4 Sheets-Sheet 4

JOHN V. BLANKENBAKER,
INVENTOR.

BY Henry Heyman

ATTORNEY.

United States Patent Office 2,892,587
Patented June 30, 1959

2,892,587

RESULT-FROM-CARRY ADDER-SUBTRACTERS

John Virgil Blankenbaker, Los Angeles, Calif., assignor, by mesne assignments, to Hughes Aircraft Company, a corporation of Delaware Application September 3, 1953, Serial No. 378,307

26 Claims. (Cl. 235—164)

This invention relates to result-from-carry adder-subtracters and, more particularly, to binary or binary-coded decimal adder-subtracters wherein the result is formed as a function of the binary carry series, no separate sum or difference producing network being required.

Many adders, subtracters and adder-subtracters are presently known wherein the binary carry series and result, either sum or difference, are formed through separate networks, except for the inclusion of a delayed carry signal in the sum or difference producing network. Such circuits, for example, are described and claimed in copending U.S. patent application Serial No. 189,318, for "Arithmetic Units for Digital Computers," by E. C. Nelson, filed October 10, 1950, now abandoned.

The present invention contemplates a novel adder-subtracter circuit where the result digits which are formed are produced as a function of the carry signal produced at the same time, rather than the delayed carry signal usually utilized. By utilizing the novel binary result-from-carry adder-subtracter of the present invention in combination with binary-coded decimal correction networks, it is possible to form a result-from-carry binary-coded decimal adder-subtracter wherein the desired binary-coded decimal result is produced directly as a function of: the binary carry series; the signals produced by a comparison flip-flop indicating when the binary carry digits are equal to the binary sum or difference; and the signals produced by the correction flip-flops required in the correction network. Thus, it is not necessary to separately produce a signal series corresponding to the true binary sum or difference.

With the adder-subtracter of the present invention, therefore, it is possible to considerably simplify binary-coded decimal arithmetic units wherein the true binary result is separately produced and then corrected to provide the desired binary-coded decimal result; the general design of such arithmetic units being described in two copending U.S. patent applications. In the first copending application Serial No. 278,408, for "Arithmetic Units for Decimal-Coded Binary Computers," by D. L. Curtis, filed March 25, 1952; both serial and parallel arithmetic units are considered, each of the several embodiments disclosed including a correction control network which produces a control signal when the true binary result is not in the desired binary-coded decimal form. A correction transfer circuit, responsive to the control signal, is utilized to correct the true binary result to the desired binary-coded decimal form when the necessity therefor is indicated by the control signal.

An improved circuit for correcting the true binary result to the desired binary-coded decimal result is described in a second copending U.S. application Serial No. 322,665, for "Serial Arithmetic Units for Binary-Coded Decimal Computers," by E. C. Nelson, filed November 26, 1952, now Patent No. 2,823,855. The feature of the circuit disclosed in the second copending application is that the true binary result is shifted and corrected in a single operation, making it possible to reduce the amount of storage capacity required to record the numbers as well as the amount of time required in adding input numbers. The second copending application to Nelson contains a considerable amount of description concerning the logical design of shifting and correcting binary-coded decimal arithmetic units and therefore is incorporated into the present specification by way of frequent reference, being referred to simply as the above-mentioned copending application to Nelson.

In the circuit of the copending application to Nelson the true binary result signal and the binary carry signal produced by the separate networks are utilized throughout the binary-coded decimal correction circuits so that, in practical applications, it is necessary to introduce a buffer flip-flop between the binary result producing network and the correction network. During the correction period, then, the buffer flip-flop stores the fourth binary digit, referred to as $Rb^4$, and the carry flip-flop the fourth binary carry $Cb^4$, representing in effect the fifth result digit. As will be more fully understood after the present invention is considered in detail, the introduction of the buffer flip-flop changes the timing of the correction operation so that during the time a binary-coded decimal correction is made upon one group of four binary signals, the first binary result signal of the next group of four digits is being produced by the binary result producing network. As a result, decimal carries produced during the corrections must be half-added to the true binary result or corrected decimal result later during the adder-subtracter operation. A special correction of this type necessitates additional gating circuits which are not required in binary-coded decimal adder-subtracters utilizing the present invention; since, according to the present invention, the first binary result digit of the next group has not yet been formulated during the binary-coded decimal correction of the previous group. Thus, it is possible to enter the binary-coded decimal carry signal into the binary carry flip-flop, effectively adding it to the next group of signals.

As will be more fully understood from the following description, the comparison flip-flop required in embodiments of the present invention is not an additional flip-flop since it operates as well as a buffer flip-flop isolating the correction circuits from the binary carry producing circuits. Thus, the present invention makes possible an economy in gating circuits without necessitating any additional flip-flops.

In general, the binary-coded decimal correction circuits utilized in combination with the present invention are based upon the basic principles explained in detail in the above-mentioned copending application to Nelson. These principles, therefore, are only briefly considered herein, reference for further details being made to the copending application. In a few instances, however, it is convenient to introduce new analysis techniques which facilitate the development of logical equations defining the special correction circuits associated with the present invention.

It will be established, moreover, that the result-from-carry technique taught by the present invention makes possible a simpler binary-coded decimal correction procedure wherein the decimal carry and fourth binary digit of the decimal result ($Rd^4$) are produced during one time interval, and the second and third binary digits of the decimal result ($Rd^2$ and $Rd^3$) are then formed during a second time interval, the decimal carry signal ($Cd$) and fourth binary digit signal ($Rd^4$) previously produced being utilized to simplify the correction. The time-sharing correction thus made possible allows a considerable reduction in gating circuit levels as well as a reduction in the number of gating elements required.

According to the present invention a true binary result-from-carry circuit is provided which includes a flip-flop C for storing the binary carry series and a flip-flop Q for storing a series of comparison signals indicating the correlation between the carry signal and the corresponding binary result signal $Rb$. Since signal $Rb$ may be derived from the carry and comparison flip-flop signals with a very simple gating circuit, it is possible to utilize signal $Rb$ throughout the binary-coded decimal correction circuits without the addition of an additional buffer flip-flop as is ordinarily required where signal $Rb$ is separately produced through a separate network. While generating signal $Rb$ as a function of signals C and Q allows an economy of gating circuit elements, a greater number of gating levels are required than are used in correction circuits operating directly from signals C and Q.

For some applications, therefore, it is desirable to perform the binary-coded decimal corrections directly as a function of complementary carry signals C and $\bar{C}$ and complementary comparison signals Q and $\bar{Q}$; thus reducing the number of gating levels required and eliminating entirely the necessity for separately producing a signal series $Rb$. Finally, the correction process may be further simplified, in terms of gating elements required, by first producing the desired binary-coded decimal carry signal $Cd$ and entering signal $Cd$ into the carry flip-flop C; and, at the same time, entering a comparison signal Q into flip-flop Q corresponding to a corrected decimal result digit. Signals C, $\bar{C}$, Q and $\bar{Q}$ are then utilized in a second correction process during which the decimal digits $Rd^2$ and $Rd^3$ are produced.

Accordingly it is an object of the present invention to provide a novel result-from-carry binary adder-subtracter.

Another object is to provide a binary result-from-carry circuit which may be utilized with binary-coded decimal correction circuits, obviating the necessity of a separate true binary result generating network.

It is also an object of the present invention to provide a simply mechanized circuit for adding or subtracting a pair of serially-applied decimal numbers, of which the decimal digits are represented by binary digits according to the 1-2-4-8 code.

An additional object is to provide a result-from-carry binary-coded decimal adder-subtracter wherein a result-to-carry comparison flip-flop is utilized as a buffer stage making it possible to correct for binary coded decimal carries without additional half-adder correction circuits.

A further object is to provide an improved serial binary coded decimal adder-subtracter wherein the desired binary-coded decimal result is produced directly as a function of the true binary carry and a comparison signal, without a separately produced true binary sum or difference signal.

Still another object is to provide a serial binary result-from-carry adder-subtracter including a carry flip-flop C and a comparison flip-flop Q, the true binary result being representable as a function of signals C and Q.

Yet another object is to provide a serial binary-coded decimal adder-subtracter including flip-flops C and Q storing the true binary carries and carry-to-binary result comparison signals, respectively; the binary-coded decimal correction signals being derived from signals C, $\bar{C}$, Q and $\bar{Q}$, no signal $Rb$, representing the true binary result, being required.

Yet a further object is to provide a result-from-carry binary-coded decimal adder-subtracter wherein corrections are performed on a time-sharing basis making it possible to reduce the number of gating elements required.

The novel features which are beileved to be characteristic of the invention, both as to its organization and method of operation, together with further objects and advantages thereof, will be better understood from the following description considered in connection with the accompanying drawings in which several embodiments of the invention are illustrated by way of examples. It is to be expressly understood, however, that the drawings are for the purpose of illustration and description only, and are not intended as a definition of the limits of the invention.

Figure 1:
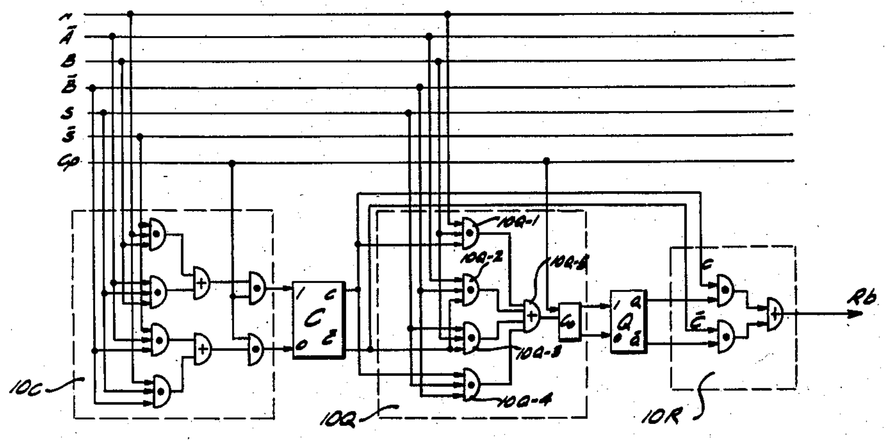
Fig. 1 is a schematic diagram of a serial binary result-from-carry adder-subtracter according to the present invention.

Reference is now made to Fig. 1 wherein there is shown a serial binary result-from-carry adder-subtracter according to the present invention. As shown in Fig. 1, the adder-subtracter includes a carry flip-flop C for producing complementary carry signals C and $\bar{C}$ corresponding to carries resulting from the addition or substraction of input signals A and B; and a comparison flip-flop Q for producing signals Q and $\bar{Q}$ indicating when the carry digit produced is equal to the corresponding sum or difference digit $Rb$.

Flip-flops C and Q are controlled through separate logical gating circuits 10C and 10D, respectively; and the binary result signal $Rb$ is produced by gating circuit 10R. The logical gating circuits are mechanized according to logical Boolean equations which define the signals which the gates produce. Before the invention may be fully understood, therefore, it is necessary to consider the derivation of these logical equations. In the equations and tables which follow the subscript $j$ is utilized to indicate binary digit position of the input information. Thus, symbols $A_j$ and $B_j$ represent the $j^{th}$ binary digits of the input numbers A and B. The carry $C_j$ represents the carry digit resulting from the addition or subtraction of the $j^{th}$ column of the input information. Similarly, carry $C_{j-1}$ represents the carry digit derived from the previous column of the input information, which is to be included in the addition or subtraction of the $j^{th}$ column of the input information.

An algebraic representation of variable $Q_j^+$, $S_j$, and $C_j^+$ may be derived from "truth" Table I, shown below, wherein all of the possible binary number situations are included for the variable $A_j$, $B_j$ and $C_{j-1}$.

*Table I (A plus B)*

| Rule | $A_j$ | $B_j$ | $C^+_{j-1}$ | $C^+_j$ | $Q^+_j$ | $Rb_j = S_j$ |
|---|---|---|---|---|---|---|
| 1 | 0 | 0 | 0 | 0 | 1 | 0 |
| 2 | 0 | 0 | 1 | 0 | 0 | 1 |
| 3 | 0 | 1 | 0 | 0 | 0 | 1 |
| 4 | 0 | 1 | 1 | 1 | 0 | 0 |
| 5 | 1 | 0 | 0 | 0 | 0 | 1 |
| 6 | 1 | 0 | 1 | 1 | 0 | 0 |
| 7 | 1 | 1 | 0 | 1 | 0 | 0 |
| 8 | 1 | 1 | 1 | 1 | 1 | 1 |

As indicated in Table I, the sum digit $S_j$ is equal to the new carry $C_j^+$ only when $A_j$, $B_j$, and $C_{j-1}^+$ are all equal to 0 or all equal to 1. Defining $O_j^+$, then, as a variable or signal which is equal to 1 when $S_j$ equals $C_j^+$, $Q_j^+$ may be represented algebraically as:

$$Q_j^+ = S_j.C_j^+ + \overline{S}_j.\overline{C}_j^+$$

$$Q_j^+ = \overline{A}_j.\overline{B}_j.\overline{C}^+_{j-1} + A_j.B_j.C^+_{j-1}$$

$$\overline{Q}_j^+ = (A_j + B_j + C^+_{j-1})\overline{A}.(_j + \overline{B}_j + \overline{C}^+_{j-1})$$

where the dot (.) is the logical "and" the bar (—) represents a complement, and the plus (+) is the logical non-exclusive "or." The function for $Q_j$ then is interpreted as follows: $Q_j^+$ is 1 when $A_j$, $B_j$, and $C_{j-1}^+$ are equal to 1 or when complementary signals $\overline{A}_j$, $\overline{B}_j$, and $\overline{C}_{j-1}^+$, are equal to 1 ($A_j$, $B_j$, and $C_j$ being equal to 0).

With the variables $Q_j^+$ and $\overline{Q}_j^+$ thus defined the variables $S_j$ may then be written in terms of $C_j^+$ and $Q_j^+$ as follows:

$$S_j = Q_j^+.C_j^+ + \overline{Q}_j^+.\overline{C}_j^+$$

$$\overline{S}_j = Q_j^+.\overline{C}_j^+ + \overline{Q}_j.C_j^+$$

As is more fully explained in the above-mentioned copending application to E. C. Nelson, Serial No. 189,318, the complementary carry signals $C_j^+$ *and* $\overline{C}_j^+$ may be defined as follows:

$$C_j^+ = A_j.B_j + A_j.C_{j-1} + B_j.C_{j-1}$$

$$\overline{C}_j^+ = \overline{A}_j.\overline{B}_j + \overline{A}_j.\overline{C}_{j-1} + \overline{B}_j.\overline{C}_{j-1}$$

In a similar manner the comparison, difference, and carry signals for the subtraction of B from A (A—B) may be derived from Table II below. These functions are indicated below Table II as functions $Q_j^-$, $D_j$, and $C_j^-$, respectively.

*Table II (A minus B)*

| Rule | $A_j$ | $B_j$ | $C^-_{j-1}$ | $C^-_j$ | $Q^-_j$ | $Rb_j = D_j$ |
|---|---|---|---|---|---|---|
| 1 | 0 | 0 | 0 | 0 | 1 | 0 |
| 2 | 0 | 0 | 1 | 1 | 1 | 1 |
| 3 | 0 | 1 | 0 | 1 | 1 | 1 |
| 4 | 0 | 1 | 1 | 1 | 0 | 0 |
| 5 | 1 | 0 | 0 | 0 | 0 | 1 |
| 6 | 1 | 0 | 1 | 0 | 1 | 0 |
| 7 | 1 | 1 | 0 | 0 | 1 | 0 |
| 8 | 1 | 1 | 1 | 1 | 1 | 1 |

$$Q_j^- = A_j.B_j.C_{j-1} + \overline{A}_j.\overline{B}_j.\overline{C}_{j-1} + B_j.C_{j-1} + B_j.C_{j-1}$$

$$= Q_j^+ + B_j.\overline{C}_{j-1} + \overline{B}_j.C_{j-1}$$

$$D_j = S_j$$

$$C_j^- = \overline{A}_j.B_j + \overline{A}_j.C_{j-1} + B_j.C_{j-1}$$

With the introduction of the sign indicating signals S and $\overline{S}$ complete add-subtract, result-from-carry functions may be provided; signals S and $\overline{S}$ being defined so that they are equal to 1 and 0, respectively, during subtraction, and 0 and 1, respectively, during addition.

Table II–A indicates how the various signals are combined to obtain the desired result.

*Table II–A*

| Time | Input | | Flip-flops | | Output |
|---|---|---|---|---|---|
| | $A_j$ | $B_j$ | $C_{j-1}$ | $Q_{j-1}$ | $Rb_{j-1}$ |
| $t_0$ | $A_1$ | $B_1$ | | | |
| $t_1$ | $A_2$ | $B_2$ | $C_1$ | $Q_1$ | $Rb_1$ |
| $t_2$ | $A_3$ | $B_3$ | $C_2$* | $Q_2$* | $Rb_2$* |
| $t_3$ | $A_4$ | $B_4$ | $C_3$ | $Q_3$ | $Rb_3$ |
| $t_4$ | $A_5$ | $B_5$ | $C_4$ | $Q_4$ | $Rb_4$ |
| $t_5$ | $A_6$ | $B_6$ | $C_5$ | $Q_5$ | $Rb_5$ |
| $t_6$ | $A_7$ | $B_7$ | $C_6$ | $Q_6$ | $Rb_6$ |
| $t_7$ | $A_8$ | $B_8$ | $C_7$ | $Q_7$ | $Rb_7$ |

Certain quantities shown in Table II–A are enclosed within a block. These quantities include the input quantities $A_2$ and $B_2$ and a carry $C_1$ from the previous binary position. These quantities are used as independent variables in determining the comparison quantity $Q_2$, the carry $C_2$ from the binary position undergoing computation to the next binary position and the output quantity $Rb_2$ representing the arithmetic combination of $A_2$ and $B_2$ on a binary basis. The quantities $C_2$, $Q_2$ and $Rb_2$ are considered as dependent variables and are indicated as such by asterisks in Table II–A. Similar combinations of signals occur in the successive time intervals. The complete equations then are:

$$Q_j^\pm = A_j.B_j.C_{j-1} + \overline{A}_j.\overline{B}_j.\overline{C}_{j-1} + S.(B_j.\overline{C}_{j-1} + \overline{B}_j.C_{j-1})$$

$$R_j = Q_j^\pm.C_j^\pm + \overline{Q}_j^\pm.\overline{C}_j^\pm$$

$$\overline{R}_j = Q_j^\pm.\overline{C}_j^\pm + \overline{Q}_j^\pm.C_j^\pm$$

$$C_j^\pm = B_j.C_{j-1} + \overline{S}.(A_j.C_{j-1} + A_j.B_j) + S.(\overline{A}_j.C_{j-1} + \overline{A}_j.B_j)$$

where the symbol $_j^\pm$ denotes a binary digit variable related to the $j^{th}$ column of input information, and expressed in terms of both addition and subtraction operations.

Before considering the mechanization of logical gating circuit 10C and 10Q it is necessary to consider the general form of equations defining the input functions for flip-flops. The discussion here is brief since the general theory of flip-flop control functions is discussed in considerable detail in the above-mentioned application by E. C. Nelson as well as in the following copending applications: Serial No. 327,567, for "Binary-Coded Flip-Flop Counters," by E. C. Nelson, now Patent No. 2,816,223, and Serial No. 327,131, for "Binary-Coded Flip-Flop Counters," by R. R. Johnson.

Flip-flops C and Q shown in Fig. 1 are assumed to be conventional flip-flops having 1 and 0 input circuits such that pulses applied separately to the 1 and 0 input circuit of a flip-flop set the flip-flop to stable states representing binary 1 and 0, respectively; and the simultaneous application of pulses to both 1 and 0 input circuit of a flip-flop "triggers" the flip-flop or causes it to change its stable state from 1 to 0 or from 0 to 1. It should be understood, however, that other types of flip-flops may be utilized provided that it is controlled through a properly mechanized logical gating circuit. For example, it will be shown that an "overriding" flip-flop may be utilized where the Boolean equation defining the controlling logical gating circuit indicates the conditions where the flip-flop is to be set to 1, regardless of its previous state. In utilizing an "overriding" flip-flop pulses are continuously applied to the 0 input circuit of the flip-flop so that it is set to 0 unless the logical gating circuit conditions are satisfied, in which case a pulse is applied to the 1 input circuit of the flip-flop "overriding" the pulse applied to the 0 input circuit and setting the flip-flop to 1.

Three general types of flip-flop input functions may be utilized to control the sequence of stable states of an associated flip-flop. According to one type of equation, the sequence of stable states of the flip-flop are directly defined so that the value of the equation (1 or 0) at a particular time indicates the next flip-flop setting. This type of function may be referred to as a "setting" function. When a setting function is utilized the flip-flop must be an "overriding" flip-flop of the type just described or a complementer circuit must be introduced to translate the gate output signal into complementary signals. As shown in Fig. 1, gating circuit 10Q is mechanzed according to a "setting" function and a complementer circuit CO is utilized to translate the output signal of gate 10Q into complementary signals which are applied to the 1 and 0 input circuit of flip-flop Q. A circuit suitable for providing the desired complementary signals is described in copending U.S. application Serial No. 308,-045, for "Complementary Signal Generating Networks," by D. L. Curtis, filed September 5, 1952, now Patent No. 2,812,451.

According to a second type of defining equation, the conditions for changing the flip-flop stable state or "triggering" the flip-flop are established. When this type of mechanization is utilized, a conventional flip-flop is employed and the gating circuit signal is applied to both 1 and 0 input circuits of the flip-flop.

In many situations, the changing type of equation may be separated into two partial-changing functions which separately define the conditions for changing the associated flip-flop stable state from 0 to 1, and from 1 to 0. The partial-changing functions are particularly useful where the equations include the output signals of the flip-flop to be controlled. In this case the partial-changing functions may be simplified according to rules which are briefly considered below and fully described in the above-mentioned copending applications by E. C. Nelson and R. R. Johnson.

The "setting," "changing," and simplified partial changing functions for controlling a flip-flop F*j* (*j* representing any flip-flop) are designated respectively by the notation: $t_0Fj=$; $1Fj=0Fj=$; and $1Fj=$, and $0Fj=$, respectively.

As is more fully explained in the above-mentioned copending applications to E. C. Nelson and R. R. Johnson, any flip-flop function may be written in the form: $t_0Fj=\bar{F}^j.G+F^j.\bar{H}$, which may be reduced to the simplified partial changing functions:

$$1Fj=G$$
$$0Fj=H$$

G and H being any functions of variables other than $F^j$ and $\bar{F}^j$, where $F^j$ and $\bar{F}^j$ are the signals produced by flip-flop F*j*.

The carry function for flip-flop C may be written as:

$$t_0C=C.(B+\bar{S}.A+S.\bar{A})+(C+\bar{C}).(\bar{S}.AB+S.\bar{A}.B)$$
$$=C.(B+\bar{S}.A+S.\bar{A}+\bar{S}.A.B+S.\bar{A}.B)+\bar{C}.(\bar{S}.A.B+S.\bar{A}.B)$$
$$=\bar{C}.(\bar{S}.A.B+S.\bar{A}.B)+C.(B+\bar{S}.A+S.\bar{A})$$

where the functions $(\bar{S}.A.B+S.\bar{A}.B)$ and $(B+\bar{S}.A+S.\bar{A})$ correspond to the functions G and $\bar{H}$ above. Thus, the carry flip-flop input function may also be written as:

(10C) $1C=(\bar{S}.A.B+S.\bar{A}.B).Cp$
$0C=(\bar{S}.\bar{A}.\bar{B}+S.A.\bar{B}).Cp$ where signal C*p* is introduced to indicate a synchronizing "and" condition, signal C*p* occurring once each binary digit time interval.

The equation defining the input circuit for flip-flop Q is most conveniently written as a "setting" function in the form:

(10Q) $t_0Q=(A.B.C+\bar{A}.\bar{B}.\bar{C}+S.B.\bar{C}+S.\bar{B}.C).Cp$ and output gating circuit 10R is mechanized according to the function:

(10R) $R_j=Q.C+\bar{Q}.\bar{C}$

In these functions it will be noted that the actual flip-flop signals have been substituted for the variables discussed above; thus, A, B and C correspond to $A_j$, $B_j$, and $C_{j-1}$ discussed above.

As is indicated in Fig. 1, each of the "and" functions in the equations defining gating circuits 10C, 10Q, and 10R (in corresponding equations shown above) is provided by an "and" circuit which responds to signals applied to separate input terminals and produces a 1-representing output signal only when all input signals are 1-representing signals. Thus, "and" circuit 10Q–1, in gating circuit 10Q responds to signals A, B, and C applied to separate input signals and produces a 1-representing output signal only when all of signals A, B, and C are 1-representing signals. Similarly, "and" circuits 10Q–2, 10Q–3, and 10Q–4 respond to separately applied input signals to produce the 1-representing output signal defined by the corresponding "and" function.

Each of the "or" functions in the above equations is provided by an "or" circuit which responds to separately applied input signals and produces a 1-representing output signal when any one or more of the input signals is a 1-representing signal. Thus, "or" circuit 10Q–5 responds to signals representing $A.B.C$, $\bar{A}.\bar{B}.\bar{C}$, $S.B.\bar{C}$, and $S.\bar{B}.C$ applied to separate input terminals and produces a 1-representing output signal when one or more of these "and" conditions is fulfilled.

The manner in which the other logical circuits are mechanized should be apparent from the examples considered. The operation of the binary result-from-carry adder-subtracter is illustrated in Table III below which illustrates a binary time sequence function of the various flip-flop signals during a typical operation.

*Table III*

| 10 | 9 | 8 | 7 | 6 | 5 | 4 | 3 | 2 | 1 | | |
|---|---|---|---|---|---|---|---|---|---|---|---|
| - | 0 | 0 | 1 | 0 | 1 | 1 | 1 | 0 | 1 | 0 | A=93. |
| - | 0 | 0 | 1 | 0 | 0 | 1 | 1 | 1 | 0 | 0 | B=78. |
| - | 0 | 1 | 0 | 1 | 1 | 1 | 0 | 0 | 0 | 0 | C+. |
| 1 | 0 | 0 | 0 | 0 | 1 | 0 | 0 | 0 | 1 | - | Q+. |
| 0 | 1 | 0 | 1 | 0 | 1 | 0 | 1 | 1 | 0 | - | S*b*=171. |
| 0 | 0 | 0 | 0 | 0 | 1 | 1 | 1 | 0 | 0 | - | C−. |
| 1 | 1 | 1 | 1 | 1 | 1 | 1 | 1 | 0 | 1 | - | Q−. |
| 0 | 0 | 0 | 0 | 0 | 1 | 1 | 1 | 1 | 0 | - | D*b*=15. |

As indicated in Table III the final sum or difference signal series are produced after a delay of one binary digit time interval, so that the least significant digits of S*b* and D*b* are produced during the second time interval of Table III. The operation of the logical circuits may be noted in Table III. The carry flip-flop C is set to 1 after the first occurrence of the condition $A.B=1$ (see $C_+$) for addition and remains 1 until the first condition $\bar{A}.\bar{B}=1$ when it is set to 0; similarly, in subtraction, flip-flop C is set to 1 for $\bar{A}.B=1$ and to 0 for $A.\bar{B}=1$.

During addition or subtraction flip-flop Q is set to 1 one binary digit time interval after all of signals A, B, and C are 0 or 1. In subtraction flip-flop Q is also set to 1 after either $B.\bar{C}$ or $\bar{B}.C$ is 1. Both the sum and difference functions are defined by the function:

$$Rb=Q.C+\bar{Q}.\bar{C}$$

occurring during the same time interval.

When the binary result-from-carry adder-subtracter is to be utilized in a binary-coded decimal system it is necessary to make correction for the situation where a decimal carry C*d* is required and must be entered into flip-flop C. It is also necessary to modify the function for flip-flop Q since the decimal carry creates certain situations where signal C is not equal to R unless the decimal carry is specified as 1 or 0.

A complete carry function with the decimal carry C*d* included may be determined from Table IV below, wherein the signal C*d* is introduced as a quantity having the value of 1 or 0. It will be noted that C*d* is always 1 when the binary carry $C_{j-1}$ is 1.

*Table IV (A plus B)*

| Rule | $A_j$ | $B_j$ | $(C^{+}_{j-1})$ | C*d* | $C^{+}_{j}$ | $S_j$ | $Q_j$ |
|---|---|---|---|---|---|---|---|
| 1 | 0 | 0 | (0) | C*d* | 0 | C*d* | $\bar{C}d$ |
| 2 | 0 | 0 | (1) | 1 | 0 | 1 | 0 |
| 3 | 0 | 1 | (0) | C*d* | C*d* | $\bar{C}d$ | 0 |
| 4 | 0 | 1 | (1) | 1 | 1 | 0 | 0 |
| 5 | 1 | 0 | (0) | C*d* | C*d* | $\bar{C}d$ | 0 |
| 6 | 1 | 0 | (1) | 1 | 1 | 0 | 0 |
| 7 | 1 | 1 | (0) | C*d* | 1 | C*d* | C*d* |
| 8 | 1 | 1 | (1) | 1 | 1 | 1 | 1 |

Whereas Table I illustrates the relationship which applies for ordinary binary addition, Table IV is intended to particularly illustrate the results of the addition of the first binary digits of a pair of decimal digits of the numbers A and B. The binary digits to be added are $A_j$, $B_j$, and C*d*, where C*d* represents the decimal carry resulting from the addition of the previous pair of decimal digits of the input numbers. In this particular case, since $A_j$ and $B_j$ represent the first or least significant binary digits of a new pair of decimal digits, $C_{j-1}^{+}$ represents the true binary carry resulting from the addition of the last pair of binary digits of the previous pair of decimal digits. Whenever $C_{j-1}^{+}$ is 1, C*d* is also 1; when $C_{j-1}^{+}$ is 0 the value of C*d* is indeterminate and hence is indicated simply as C*d*. Thus according to rule 5, for example, the new carry signal $C_j^{+}$ (resulting from the addition of the first binary digits of the new pair of decimal digits) will have the same value as C*d*, whereas the true sum $S_j$ will have the opposite value. It may be noted that Table I represents a special case for the relationships represented by Table IV; namely, the case where C*d* is 0.

As indicated in Table IV, a complete addition carry function may be expressed as follows:

$$C_j^{+}=A_j.B_j+A_j.C_{j-1}^{+}+B_j.C_{j-1}^{+}+Cd.(A_j+B_j)$$
$$=\overline{C}_{j-1}^{+}.[A_j.B_j+Cd.(A_j+B_j)]+C_{j-1}^{+}.(A_j+B_j)$$

The carry flip-flop function for addition, including the decimal carry then becomes:

$$1C=[A.B+Cd.(A+B)].Cp$$
$$0C=\bar{A}.\bar{B}.Cp$$

and, since no carry correction is required for subtraction, the complete add-subtract flip-flop function becomes:

$$1C=\{\bar{S}.[A.B+Cd.(A+B)]+S.\bar{A}.B\}.Cp$$
$$0C=(\bar{S}.\bar{A}.\bar{B}+S.A.\bar{B}).Cp$$

In a similar manner the function for flip-flop Q may be modified as indicated in Table IV to provide the functions:

$$t_0Q=[\bar{C}d.\bar{A}.\bar{B}.\bar{C}+A.B.(Cd+C)].Cp$$

where the signal C*d* is produced through the binary-coded decimal correction network now to be described.

Figure 2:
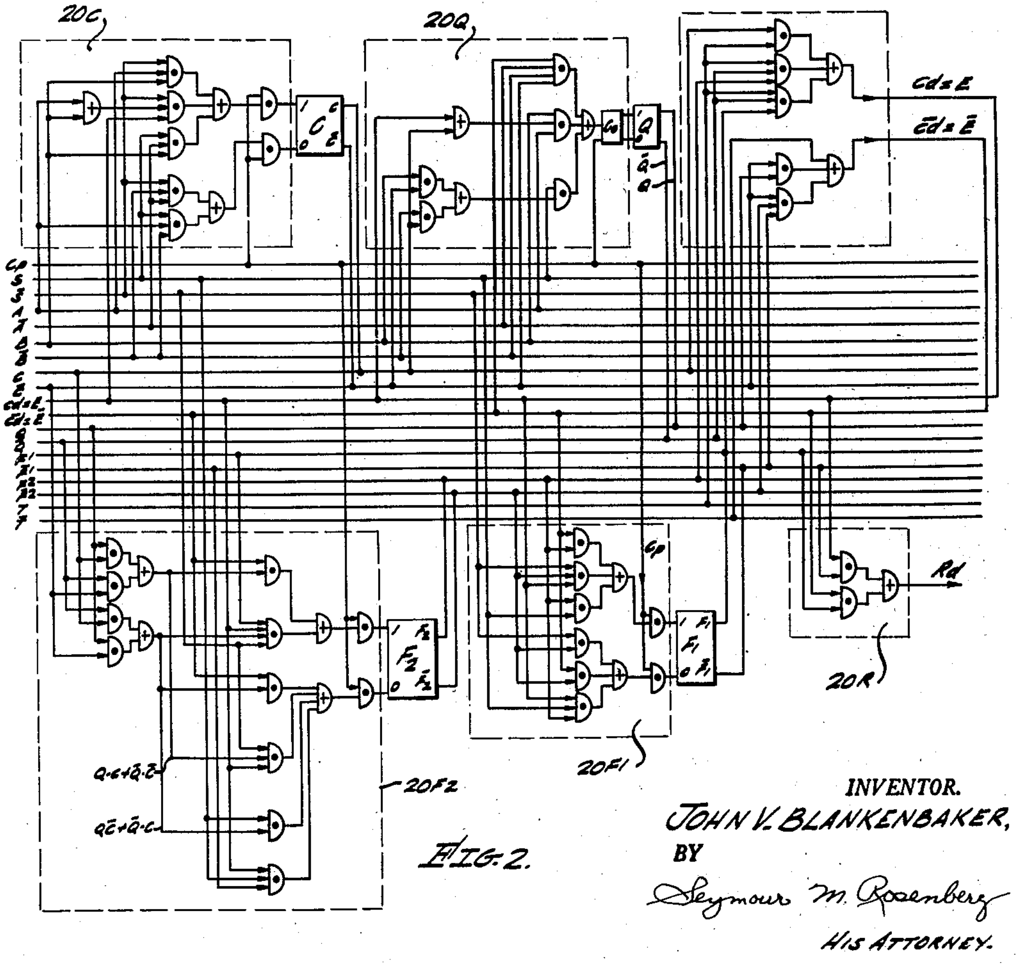
Fig. 2 is a schematic diagram of a serial binary-coded decimal result-from-carry adder-subtracter wherein a signal $Rb$ is produced as a function of the true binary carry signal C and the comparison signal Q.

One type of binary coded decimal correction network suitable for use with the result-from-carry adder-subtracter of the present invention is illustrated in Fig. 2. The general correction scheme is based upon principles fully explained in the above-mentioned copending application by E. C. Nelson and the notation utilized herein is consistent with that utilized in this application. As in the copending application, two flip-flops F1 and F2 are included in the correction network; these flip-flops being controlled through logical gating circuits 20F1 and 20F2, respectively.

As is more fully explained in the copending application, no correction is required in the first binary digit of the true binary result where "excess-even" binary codes are utilized and consequently during the correction period, indicated by the timing signal T having a level representing binary 1, it is only necessary to have binary information concerning the second, third and fourth binary digits of the true binary result and the fourth carry digit; these digits being represented respectively by the variables $Rb^4$, $Rb^3$, $Rb^2$, and $Cb^4$.

As derived in the copending application, the correction indicating signals E and $\bar{E}$ for the excess-0 binary-coded decimal code are defined as follows:

$$\bar{E}=Cb^4.(Rb^4+Rb^3.Rb^2)$$
$$\overline{E}=\overline{Cb}^4.(\overline{Rb}^4+\overline{Rb}^3.\overline{Rb}^2)$$

Signals E and $\bar{E}$ define the conditions where the true binary sum is a number which is greater than 9. If the binary carry signal $Cb^4$ is 1 the true binary sum is 16, 17, 18, or 19; and if the fourth binary result digit is 1 and either the third or second digit is 1, the true binary sum is any of the numbers 10 through 15. As is further explained in the copending application, the same correction signals may be utilized for subtraction although the condition $Rb^4.(Rb^3+Rb^2)$ is redundant.

The signals E and $\bar{E}$ may now be redefined by replacing the variable $Rb^4$ by its equivalent result-from-carry digit. This provides the functions:

$$E=Cb^4+(Q^4.Cb^4+\bar{Q}^4.\bar{C}b^4).(Rb^3+Rb^2)$$
$$=Cb^4+\bar{Q}^4.(Rb^3+Rb^2)$$
$$E=\overline{Cb}^4.(Q^4+\overline{Rb}^3.\overline{Rb}^2)$$

Of particular interest in these function is that the variable $Rb^4$ is effectively replaced by the variable $\bar{Q}^4$, representing the fourth comparison digit. Thus, it should be apparent that flip-flop Q will function in this respect as a buffer flip-flop since it produces a flip-flop signal which substitutes for a matrix signal previously produced by the binary result producing network.

The complete add-subtract correction functions for the excess-0 binary-coded decimal code derived in the copending application may now be modified with the introduction of the redefined signals E and $\bar{E}$ and the replacement of signal R*b* with $Q.C+\bar{Q}.\bar{C}$. The functions derived in the copending application appear as follows:

$$E=T.C+T.Rb.F^2+T.Rb.F^1$$
$$\overline{E}=\overline{T}+\overline{C}.\overline{Rb}+\overline{C}.\bar{F}^2.\bar{F}^1$$

$$Rd=E.\bar{F}^1+\bar{E}.F^1$$

$$1F1=(\bar{E}.\bar{F}^2+\bar{S}.E.\bar{F}^2+S.F^2).Cp$$
$$0F1=(\bar{S}.\bar{F}^2+\bar{E}.\bar{F}^2+S.E.F^2).Cp$$

$$1F2=(\overline{E}.Rb+\overline{S}.E.\overline{Rb}.F^1).Cp$$
$$0F2=(\overline{E}.\overline{Rb}+\overline{S}.E.Rb+S.\overline{Rb}+S.E.\overline{F}^1).Cp$$

The signal R*d* in these functions is produced by output gating circuit 20R and corresponds to the desired binary-coded decimal result series.

This set of functions is then modified by replacing the signal R*b*, previously produced in a separate sum or difference producing network, by the function: $Q.C+\bar{Q}.\bar{C}$. The new set of funds then appear as follows, the equation numbers shown corresponding to the gating circuits shown in Fig. 2.

(20C) $1C=[\overline{S}.A.B+\overline{S}.Cd.(A+B)+S.\overline{A}.B].Cp$ $$0C=(\overline{S}.\overline{A}.\overline{B}+S.A.\overline{B}).Cp$$

(20Q)

$$t_0Q=[\overline{Cd}.\overline{A}.\overline{B}.\overline{C}+A.B.(Cd+C)+S.(B\overline{C}+\overline{B}.C)].Cp$$

$$Cd=E=T.C+T.\overline{Q}.F^2+T.\overline{Q}.F^1$$

$$\overline{Cd}=\overline{E}=\overline{T}+\overline{C}.Q+\overline{C}.\overline{F^2}.\overline{F^1}$$

(20R) $Rd=E.\overline{F^1}+\overline{E}.F^1$ (20F1) $1F1=(\overline{E}.F^2+\overline{S}.E.\overline{F^2}+S.F^2).Cp$ $$0F1=(\overline{S}.\overline{F^2}+\overline{E}.\overline{F^2}+S.E.F^2).Cp$$

(20F2)

$$1F2=[\overline{E}.(Q.C+\overline{Q}.\overline{C})+\overline{S}.E.(\overline{Q}.C+Q.\overline{C}).F^1].Cp$$

$$0F2=[\overline{E}.(Q.\overline{C}+\overline{Q}.C)+\overline{S}.E.(Q.C+\overline{Q}.\overline{C})+S.(\overline{Q}.C+Q.\overline{C})+S.E.\overline{F^1}].Cp$$

Table V-A indicates the time relationship between the various quantities used in the embodiment shown in Figure 2.

*Table V-A*

| Time | Signal T | Input | | Flip-flops | | | Flip-flops | | Output |
|---|---|---|---|---|---|---|---|---|---|
| | | $A_j$ | $B_j$ | $C_{j-1}$ | $Q_{j-1}$ | Cd | $F2_{j-2}$ | $F1_{j-1}$ | $Rd_{j-1}$ |
| $t_4$ | 1 | $A_1$ | $B_1$ | $C_4$ | $Q_4$ | Cd | $Rb_3$ | $Rb_2$ | $Rd_2$ |
| $t_1$ | 0 | $A_2$ | $B_2$ | $C_1^*$ | $Q_1^*$ | 0 | $Rd_4$ | $Rd_3$ | $Rd_3$ |
| $t_2$ | 0 | $A_3$ | $B_3$ | $C_2$ | $Q_2$ | 0 | $Rb_1^*$ | $Rd_4$ | $Rd_4$ |
| $t_3$ | 0 | $A_4$ | $B_4$ | $C_3$ | $Q_3$ | 0 | $Rb_2$ | $Rb_1$ | $Rd_1=Rb_1$ |
| $t_4$ | 1 | $A_1$ | $B_1$ | $C_4$ | $Q_4$ | Cd | $Rb_3$ | $Rb_2$ | $Rd_2$ |
| $t_1$ | 0 | $A_2$ | $B_2$ | $C_1^*$ | $Q_1^*$ | 0 | $Rd_4$ | $Rd_3$ | $Rd_3$ |
| $t_2$ | 0 | $A_3$ | $B_3$ | $C_2$ | $Q_2$ | 0 | $Rb_1^*$ | $Rd_4$ | $Rd_4$ |
| $t_3$ | 0 | $A_4$ | $B_4$ | $C_3$ | $Q_3$ | 0 | $Rb_2$ | $Rb_1$ | $Rd_1=Rb_1$ |

As will be seen in the first vertical column of Table V-A, timing signals $t_1$, $t_2$, $t_3$ and $t_4$ occur on a recurrent basis. These timing signals correspond to the four binary positions required to indicate a decimal digit on a binary-coded decimal basis. Means are provided to obtain the production of a binary "1" signal at correction time interval $t_4$ and to obtain the production of a binary 0 signal at the other time intervals. Time interval $t_4$ is considered as a correction interval for reasons which will be described in detail subsequently.

Certain quantities are used as independent variables to obtain the production of dependent variables in each time interval. In time intervals $t_1$, $t_2$ and $t_3$, the input quantities A and B are combined with the binary carry C from the previous position to obtain the carry C from that position to the next, the comparison quantity Q and the binary sum R*b*. At correction time interval $t_4$, the quantities $A_1$ and $B_1$ and the binary carry $C_4$ from the previous position are combined with the decimal carry C*d* to produce the binary carry $C_1$, the comparison quantity $Q_1$ and the binary sum $Rb_1$. These dependent quantities are indicated by asterisks in Table V-A. At the same time, the binary sums for the different digits are converted to a binary coded decimal basis represented by the signals $Rd_2$, $Rd_3$ and $Rd_4$.

Table V-B indicates the various combinations of signals which may be represented as independent quantities. The table also indicates how these quantities are combined to obtain the decimal carry C*d* and the two digits $Rd_4$ and $Rd_3$ of greatest significance on a binary-coded decimal basis. Table V-B represents the situation when the input quantities A and B are added.

*Table V-B*

| Rule | Decimal sum | Q | C | $Sb^4$ | $Sb^3$ $F^2$ | $Sb^2$ $F^1$ | Cd=E | $Sd^4$ $F^{2\prime}$ | $Sd^3$ $F^{1\prime}$ |
|---|---|---|---|---|---|---|---|---|---|
| 1 | 0, 1 | 1 | 0 | 0 | 0 | 0 | 0 | 0 | 0 |
| 2 | 2, 3 | 1 | 0 | 0 | 0 | 1 | 0 | 0 | 0 |
| 3 | 4, 5 | 1 | 0 | 0 | 1 | 0 | 0 | 0 | 1 |
| 4 | 6, 7 | 1 | 0 | 0 | 1 | 1 | 0 | 0 | 1 |
| 5 | 8, 9 | 0 | 0 | 1 | 0 | 0 | 0 | 1 | 0 |
| 6 | 10, 11 | 0 | 0 | 1 | 0 | 1 | 1 | 0 | 0 |
| 7 | 12, 13 | 0 | 0 | 1 | 1 | 0 | 1 | 0 | 0 |
| 8 | 14, 15 | 0 | 0 | 1 | 1 | 1 | 1 | 0 | 1 |
| 9 | 16, 17 | 0 | 1 | 0 | 0 | 0 | 1 | 0 | 1 |
| 10 | 18, 19 | 0 | 1 | 0 | 0 | 1 | 1 | 1 | 0 |

As may be seen in Table V-B, the decimal sum of binary-coded decimal input quantities A and B is indicated in the second vertical column. This decimal sum may be represented by a particular pattern of signals for $Sb_4$, $Sb_3$ and $Sb_2$. The quantities $Sb_4$, $Sb_3$ and $Sb_2$ represent the binary sum of the input quantities A and B in the three positions of greatest significance. The binary value of $Sb_4$ is "1" when Q and C both have indications of "0" or indications of "1." The binary value of $Sb_4$ is "0" when one of the quantities Q and C is "0" and the other of the quantities is "1." This has been set forth in the equations following Table I.

As will be seen, $Sb_2$, $Sb_3$ and $Sb_4$ directly indicate the decimal sum for values between "0" and "9." For such values, the decimal carry C*d* is "0." For decimal values between "8" and "15," the values $Sb_2$ and $Sb_3$ have a pattern corresponding to the decimal values between "0" and "7" but $Sb_4$ has a binary value of "1" for decimal values between "8" and "15" whereas $Sb_4$ has a value of "0" for decimal values between "0" and "7."

The decimal sums between "0" and "19" can be represented by a decimal carry or lack of carry and by a binary-coded decimal representation. For example, no decimal carry is obtained for decimal sums between "0" and "9" and a decimal carry of "1" is obtained for decimal sums between "10" and "19." Since a decimal carry of "1" is obtained for decimal sums greater than "10," such decimal sums can be represented in the binary positions of greatest significance by patterns corresponding to the decimal sums between "0" and "9." This may be seen in Table V–B.

At the beginning of the correction time interval $t_4$, the binary sums $Sb_3$ and $Sb_2$ are respectively indicated by the F2 and F1 flip-flops. At the end of the correction time interval $t_4$, the binary values of $Rd_4$ and $Rd_3$ are respectively indicated by the F2 and F1 flip-flops. This may be seen from Tables V–A and V–B. As will be seen from Table V–B, the F2 flip-flop is triggered from a binary pattern of "0" to a binary pattern of "1" in accordance with rules 5 and 10. In rule 5, the carry signal C is "0" and the binary sum for the digit of greatest significance is "1." In this way, the F2 flip-flop can be triggered true in accordance with the logical equation, $1F2=\bar{E}.(\bar{Q}C+\bar{Q}.\bar{C})$.

In the above equation $\bar{E}=\bar{C}d$ and $Sb_4=\bar{Q}.\bar{C}+Q.C$. Similarly, the F2 flip-flop is triggered true in accordance with rule 10 when $Cd=E$ and $F1$ are true and $Sb_4$ is false as represented by $1F2=\bar{S}.\bar{E}.(\bar{Q}C+Q.\bar{C})$.

In the above equation, the term $\bar{S}$ indicates the addition of the input quantities A and B. These equations for 1F2 are included in Equation 20F2 set forth above.

Table V–B indicates that the F2 flip-flop is triggered false during the correction time interval $t_4$ in accordance with rules 3, 4, 7 and 8. Rules 3 and 4 can be represented by an indication of "0" for $Cd$ and for $Sb_4$. This can be written as $0F2=\bar{E}.(Q.\bar{C}+\bar{Q}.C)$. Similarly, rules 7 and 8 can be represented by simultaneous indications of "1" for $Cd$ and $Sb_4$. This can be written logically as $0F2=\bar{S}.E.(Q.C+\bar{Q}.\bar{C})$. This logic for 0F2 forms a part of Equation 20F2.

The triggering of the F1 flip-flop at correction time interval $t_4$ can also be determined from Table V–B for the addition of the binary-coded decimal input quantities A and B. For example, the F1 flip-flop is triggered true from the false state in accordance with rules 3 and 9. Rule 3 can be represented by $\bar{E}.\bar{F}2$ and rule 9 can be represented as $\bar{S}.E.\bar{F}2$. This logic forms a part of Equation 20F1.

The F1 flip-flop is triggered from the true state to the false state at correction time interval $t_4$ in accordance with rules 2, 6 and 10. Rule 2 can be represented as $\bar{E}.\bar{F}2$. Rules 6 and 10 can be represented as $\bar{S}.\bar{F}2$. These terms form a part of Equation 20F1 for 0F1.

In the correction time intervals $t_1$, $t_2$ and $t_3$, F2 is triggered in a pattern corresponding to the binary sum of A and B for the position undergoing computation and of the carry C from the previous position. This represented as $$1F2=\bar{E}.(Q.C+\bar{Q}.\bar{C})$$

$$0F2=\bar{E}.(Q.\bar{C}+\bar{Q}.C)$$

As will be seen, these equations also form a part of the logic for controlling the operation of the F2 flip-flop at correction time interval $t_4$. Similarly, the pattern of operation of the F2 flip-flop is transferred to the F1 flip-flop during time intervals $t_1$, $t_2$ and $t_3$. The F1 flip-flop is triggered true in accordance with the logic $1F1=\bar{E}.F2$ and is triggered false in accordance with the logic $0F2=\bar{S}.\bar{F}^2+\bar{E}.\bar{F}^2$. These equations also form a part of the logic for controlling the operation of the F1 flip-flop at correction time interval $t_4$.

Table V–C is similar to Table V–B. However, Table V–C represents the subtraction of B from A whereas Table V–B represents the addition of B to A.

*Table V–C*

| Rule | Difference | Q | C | $Db_4$ | $Db_3$ F2 | $Db_2$ F1 | $Cd$ | $Dd_4$ F2′ | $Dd_3$ F1′ |
|---|---|---|---|---|---|---|---|---|---|
| 1 | −(9, 0) | 0 | 1 | 0 | 1 | 1 | 1 | 0 | 0 |
| 2 | −(7, 8) | 1 | 1 | 1 | 0 | 0 | 1 | 0 | 0 |
| 3 | −(5, 6) | 1 | 1 | 1 | 0 | 1 | 1 | 0 | 1 |
| 4 | −(3, 4) | 1 | 1 | 1 | 1 | 0 | 1 | 0 | 1 |
| 5 | −(1, 2) | 1 | 1 | 1 | 1 | 1 | 1 | 1 | 0 |
| 6 | (0, 1) | 1 | 0 | 0 | 0 | 0 | 0 | 0 | 0 |
| 7 | (2, 3) | 1 | 0 | 0 | 0 | 1 | 0 | 0 | 0 |
| 8 | (4, 5) | 1 | 0 | 0 | 1 | 0 | 0 | 0 | 1 |
| 9 | (6, 7) | 1 | 0 | 0 | 1 | 1 | 0 | 0 | 1 |
| 10 | (8, 9) | 0 | 0 | 1 | 0 | 0 | 0 | 1 | 0 |

Quantities $Db_4$, $Db_3$ and $Db_2$ in Table V–C represent the binary difference between the binary-coded decimal input quantities A and B in the three binary positions of greatest significance. The quantities $Db_4$ and $Db_3$ provide a representation of the difference between A and B in the two positions of greatest significance on a binary-coded decimal basis.

The quantities $Cd$, $Dd_4$ and $Dd_3$ in Table V–C respectively correspond to the quantities $Cd$, $Sd_4$ and $Sd_3$ in Table V–B for values between "0" and "+9" in both tables. For negative values represented by rules 1 to 5, inclusive, a negative carry of 1 is obtained for $Cd$. Since a negative carry is obtained, $Dd_4$ and $Dd_3$ can provide a pattern of operation which represents the decimal complement of the negative number. This decimal complement is obtained by adding the negative number to a decimal value of "+10." For example, $Dd_4$ and $Dd_3$ can provide a pattern of operation on a complementary basis corresponding to "+7" or "+8" for a difference value of "−2" or "−3."

The triggering of the F2 and F1 flip-flops at correction time interval $t_4$ can be determined from Table V–C. For example, the F2 flip-flop is triggered true in accordance with rule 10. This rule can be represented as $1F2=\bar{E}(Q.C+\bar{Q}.\bar{C})$. As will be seen, this equation corresponds to logic previously obtained from Table V–B.

The F2 flip-flop is triggered false at correction time interval $t_4$ in accordance with rules 1, 4, 8, and 9. Rules 1, 8 and 9 can be represented by the equation $$0F2=S(\bar{Q}.C+Q.\bar{C})$$

In this equation, S represents a subtraction operation. Similarly, rule 4 can be represented as $S.E.\bar{F}1$. This logic is included in Equation 20F2.

The F1 flip-flop is triggered true at correction time interval $t_4$ in accordance with rules 4 and 8. These rules can be represented by a common logic of $S.F2$. Similarly, the F1 flip-flop is triggered false at correction time interval $t_4$ in accordance with rules 1, 5 and 7. Rules 1 and 5 can be represented logically as $S.E.F2$. Rule 7 can be represented logically as $\bar{E}.\bar{F}2$. All of this logic is included in Equation 20F1.

The mechanization of a serial binary-coded decimal result-from-carry adder-subtracter according to these functions is illustrated in Fig. 2, further detailed consideration being deemed unnecessary in view of the previously considered examples and the similarity of this embodiment and that described in the copending application to E. C. Nelson.

The operation of the embodiment of Fig. 2 during a typical addition of binary-coded decimal numbers is illustrated in Table V–D.

*Table V–D*

| | | | | | | | | | | | | | | | | | | |
|---|---|---|---|---|---|---|---|---|---|---|---|---|---|---|---|---|---|---|
| 1 | 0 | 0 | 0 | 1 | 0 | 0 | 0 | 1 | 0 | 0 | 0 | 1 | 0 | 0 | 0 | 1 | 0 | T. |
| | 0 | 0 | 0 | 1 | 0 | 1 | 0 | 1 | 0 | 1 | 1 | 1 | 1 | 0 | 0 | 1 | 0 | A=1,579. |
| | 0 | 0 | 0 | 1 | 1 | 0 | 0 | 0 | 0 | 0 | 1 | 1 | 1 | 0 | 0 | 0 | 0 | B=1,838. |
| 0 | 0 | 0 | 0 | 1 | 0 | 0 | 0 | 1 | 0 | 0 | 0 | 1 | 0 | 0 | 0 | 0 | 0 | Cd. |
| 0 | 0 | 0 | 1 | 0 | 0 | 0 | 1 | 0 | 1 | 1 | 1 | 1 | 0 | 0 | 0 | 0 | 0 | Cb. |
| 1 | 1 | 0 | 1 | 0 | 0 | 0 | 0 | 0 | 0 | 1 | 1 | 0 | 1 | 1 | 0 | 1 | 1 | Q. |
| 0 | 0 | 1 | 1 | 1 | 1 | 1 | 0 | 1 | 0 | 1 | 1 | 0 | 0 | 0 | 1 | 0 | 0 | Sb. |
| 0 | 0 | 1 | 1 | 0 | 1 | 0 | 0 | 0 | 0 | 0 | 1 | 0 | 1 | 1 | 1 | 0 | 0 | Sd=3,417. |

The equations defining the circuit of Fig. 2 may be reduced to a form requiring fewer gating levels by substituting equivalent functions for E, $\bar{E}$, $Cd$ and $\overline{Cd}$, and then simplifying the resulting equations. It is preferred, however, to obtain the expanded function in terms of signals C, $\bar{C}$, Q, and $\bar{Q}$ directly from a "truth" table indicating the transformation of these signals during the correction time interval when T is equal to 1. Before considering the truth table derivation, however, it will be helpful to introduce a useful truth table theorem.

As is fully explained in the above-mentioned copending aplication by R. R. Johnson, the transformation of a flip-flop output signal F to a new signal F′ through input gating circuits defined as:

$$1F=G$$
$$0F=H$$

may be represented by the function:

$$F'=\bar{F}.G+F.\bar{H}$$

Analysis of this function indicates that if the flip-flop signal is $0(\bar{F}=1)$, F′ is equal to the previous function G; and that if the flip-flop signal was previously 1 the new signal F′ is equal to $\bar{H}$. This transformation is indicated in Table VI below.

*Table VI*

| Rule | G | H | F | F′ |
|---|---|---|---|---|
| 1 | 0 | 0 | 0 | 0 |
| 2 | 0 | 0 | 1 | 1 |
| 3 | 0 | 1 | 0 | 0 |
| 4 | 0 | 1 | 1 | 0 |
| 5 | 1 | 0 | 0 | 1 |
| 6 | 1 | 0 | 1 | 1 |
| 7 | 1 | 1 | 0 | 1 |
| 8 | 1 | 1 | 1 | 0 |

As indicated in Table VI F′ is equal to G whenever F was 0 and is equal to $\bar{H}$ whenever F was 1.

In determining gating circuits for binary-coded decimal correction both signals F and F′ are known, corresponding to a binary digit and a desired decimal digit, and, therefore it is necessary to determine the functions G and H from the functions F and F′. This is possible through an extension of the principles just considered.

The function G assumes the values of F′ whenever F was $0(\bar{F}=1)$ and the function H assumes the values of $\bar{F}'$ whenever F was 1. The operation of this principle is well illustrated in Table VI–A below.

*Table VI–A*

FLIP-FLOP INPUT SIGNAL REQUIREMENTS

| Rule | F | F′ | 1F = G | 0F = H | Corresponding rules of Table VI |
|---|---|---|---|---|---|
| 1 | 0 | 0 | 0 | --- | 1,3 |
| 2 | 0 | 1 | 1 | --- | 5,7 |
| 3 | 1 | 0 | --- | 1 | 4,8 |
| 4 | 1 | 1 | --- | 0 | 2,6 |

In Table VII below, which is derived directly from Table I, the input signal requirements for flip-flop C for producing the binary carry function $C_j^+$ are illustrated. Symbol 1C indicates the signal requirements for the 1-input circuit of flip-flop C; and symbol 0C represents the input signal requirements for the 0-input circuit of flip-flop C.

*Table VII*

| Rule | $A_j$ | $B_j$ | $C_{j-1}^+$ | $C_j^+$ | 1C | 0C |
|---|---|---|---|---|---|---|
| 1 | 0 | 0 | 0 | 0 | 0 | --- |
| 2 | 0 | 0 | 1 | 0 | --- | 1 |
| 3 | 0 | 1 | 0 | 0 | 0 | -- |
| 4 | 0 | 1 | 1 | 1 | --- | 0 |
| 5 | 1 | 0 | 0 | 0 | 0 | -- |
| 6 | 1 | 0 | 1 | 1 | --- | 0 |
| 7 | 1 | 1 | 0 | 1 | 1 | -- |
| 8 | 1 | 1 | 1 | 1 | --- | 0 |

From Table VII it is readily determined that the binary carry functions are:

$$1C=A.B=G$$
$$0C=\bar{A}.\bar{B}=H$$

It will be noted that it is unnecessary to consider the signal which is being transformed since it does not appear in the G and H functions. The embodiment shown in Figure 3 eliminates any requirement for using the decimal carry signal $Cd$ in determining the signals which indicate the decimal output on a binary-coded decimal basis. By eliminating the need for using the decimal carry signals $Cd$, only the binary input signals A and B, the binary carry signals C from the previous position, the comparison signal Q from the previous position and the binary sum signals R*b* indicated by the F2 and F1 flip-flops are used as independent quantities to determine the values of other quantities. This may be seen from Table VIII–A set forth below.

*Table VIII–A*

| Time | Signal | Input | | Flip-flops | | | | Output |
|---|---|---|---|---|---|---|---|---|
| | T | $A_j$ | $B_j$ | $C_{j-1}$ | $Q_{j-1}$ | $F^2_{j-2}$ | $F^1_{j-3}$ | $Rd_{j-3}$ |
| $t_4$ | 1 | $A_1$ | $B_1$ | $C_4$ | $Q_4$ | $Rb_3$ | $Rb_2$ | $Rd_2$ |
| $t_1$ | 0 | $A_2$ | $B_2$ | $C_1$ | $Q_2$ | $Rd_4^*$ | $Rd_3^*$ | $Rd_3$ |
| $t_2$ | 0 | $A_3$ | $B_3$ | $C_2$ | $Q_2$ | $Rb_1$ | $Rd_4$ | $Rd_4$ |
| $t_3$ | 0 | $A_4$ | $B_4$ | $C_3$ | $Q_3$ | $Rb_2$ | $Rb_1$ | $Rd_1=Rb_1$ |
| $t_4$ | 1 | $A_1$ | $B_1$ | $C_4$ | $Q_4$ | $Rb_3$ | $Rb_2$ | $Rd_2$ |
| $t_1$ | 0 | $A_2$ | $B_2$ | $C_1$ | $Q_1$ | $Rd_4^*$ | $Rd_3^*$ | $Rd_3$ |
| $t_2$ | 0 | $A_3$ | $B_3$ | $C_2$ | $Q_2$ | $Rb_1$ | $Rd_4$ | $Rd_4$ |
| $t_3$ | 0 | $A_4$ | $B_4$ | $C_3$ | $Q_3$ | $Rb_2$ | $Rb_1$ | $Rd_1=Rb_1$ |

As may be seen from Table VIII–A, the signal T has a binary value of "1" at time $t_4$ and has a binary value of "0" at times $t_1$, $t_2$ and $t_3$. Because of the binary value of "1" for T at time $t_4$, a correction is made at this time to convert the values in the $F^1$ and $F^2$ flip-flops from a binary form to a binary-coded decimal form. This may be seen from the fact that the value $Rb_2$ representing the second digit of the arithmetic combination on a binary basis of the quantities A and B is converted to the output value $Rd_2$ representing the second digit on a binary-coded decimal basis. The output quantity $Rd_2$ is actually made available during correction time interval $t_4$. At the same time, the value $Rb_3$ representing the third digit of the arithmetical combination on a binary basis is converted to a value $Rd_3$ representing the third digit on a binary-coded decimal basis. The value $Rd_4$ representing the fourth digit on a binary-coded decimal basis is also determined at the time $t_4$ and is introduced to the F2 flip-flop. In this way the second, third and fourth digits are determined in the correction time $t_4$ so as to provide a proper representation on a binary-coded decimal basis. The value $Rd_2$ is made available during correction time interval $t_4$ but the values $Rd_3$ and $Rd_4$ are made available in the F1 and F2 flip-flops during time interval $t_1$. As previously described, no correction has to be provided for the first binary digit of a number to convert the number from the binary representation to a binary-coded decimal basis.

Figure 3:
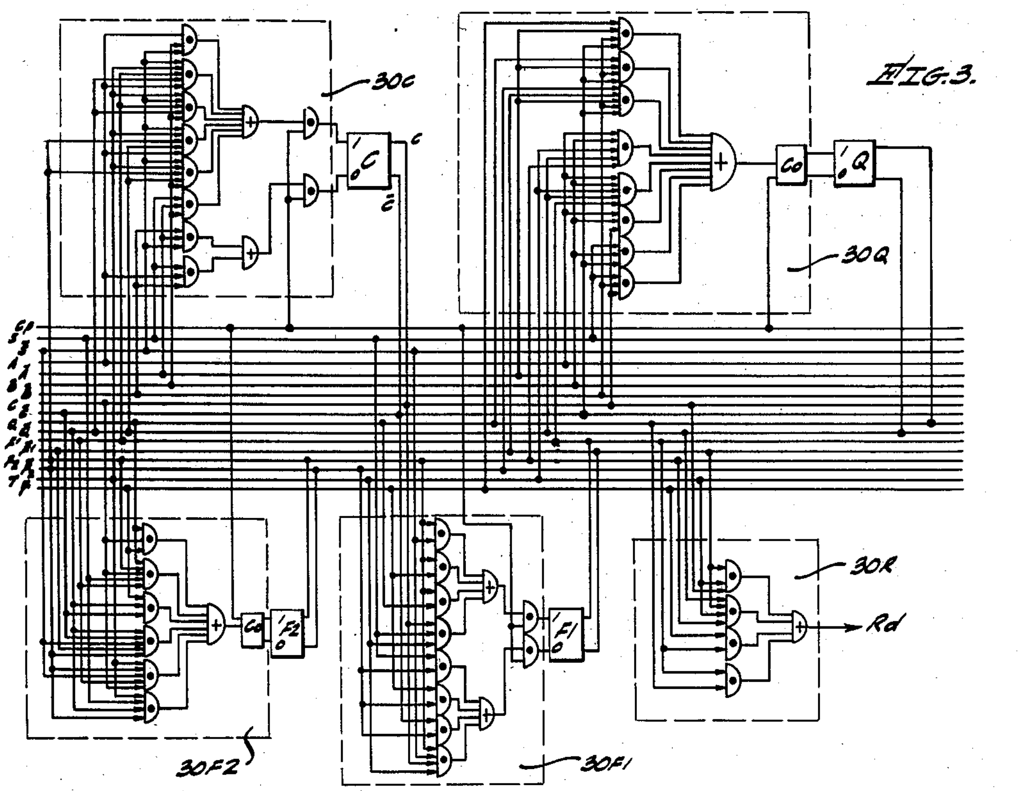
Fig. 3 is a schematic diagram of a serial binary-coded decimal result-from-carry adder-subtracter wherein the desired coded decimal result digits $Rd$ are derived directly from the signals C and Q, no network for signal $Rb$ being required.

A comparison of the techniques used in Figure 3 with the technique used in Figure 2 may be seen from the Tables V–A and VIII–A. As will be seen, in both tables a correction is made at time $t_4$ in the second, third and fourth digits of a binary-coded decimal number. At this correction time interval, the binary carry signal $C_4$ is used as a common value in both embodiments. However, the embodiment shown in Figure 2 and set forth in Table V–A uses the input quantities A and B and the decimal carry C*d* as an additional parameter, whereas the embodiment shown in Figure 3 and set forth in Table VIII–A uses the comparison value $Q_4$ and the binary results $Rb_2$ and $Rb_3$ as additional values. The quantities used as independent quantities in the embodiments set forth in Figures 2 and 3 are respectively enclosed within boxes in Tables V–A and VIII–A. The dependent quantities determined from these independent quantities are indicated by asterisks in Tables V–A and VIII–A.

Truth Table VIII, then, indicates the transformations required in correcting the binary sums to form the desired binary-coded decimal digits. As indicated in Table VIII, at the time the correction is performed T is equal to 1 and flip-flops F1 and F2 store signals corresponding to $Sb^2$ and $Sb^3$, respectively. The transformed states of flip-flops F1 and F2, then correspond to signals $Rd^3$ and $Rd^4$, since the shifting and simultaneous correction operation of the Nelson circuits is utilized.

*Table VIII*

| Rule | Sum | $Sb^4$ | | $Sb^3$ F2 | $Sb^2$ F1 | $Rd^4$ F2′ | $Rd^3$ F1′ | 1F2 | 0F2 | 1F1 | 0F1 |
|---|---|---|---|---|---|---|---|---|---|---|---|
| | | Q | C | | | | | | | | |
| 1 | (0, 1) | 1 | 0 | 0 | 0 | 0 | 0 | 0 | --- | 0 | --- |
| 2 | (2, 3) | 1 | 0 | 0 | 1 | 0 | 0 | 0 | --- | --- | 1 |
| 3 | (4, 5) | 1 | 0 | 1 | 0 | 0 | 1 | --- | 1 | 1 | --- |
| 4 | (6, 7) | 1 | 0 | 1 | 1 | 0 | 1 | --- | 1 | --- | 0 |
| 5 | (8, 9) | 0 | 0 | 0 | 0 | 1 | 0 | 1 | --- | 0 | --- |
| 6 | (10, 11) | 0 | 0 | 0 | 1 | 0 | 0 | 0 | --- | --- | 1 |
| 7 | (12, 13) | 0 | 0 | 1 | 0 | 0 | 0 | --- | 1 | 0 | --- |
| 8 | (14, 15) | 0 | 0 | 1 | 1 | 0 | 1 | --- | 1 | --- | 0 |
| 9 | (16, 17) | 0 | 1 | 0 | 0 | 0 | 1 | 0 | --- | 1 | --- |
| 10 | (18, 19) | 0 | 1 | 0 | 1 | 1 | 0 | 1 | --- | --- | 1 |

| Rule | (a) | | | | Rule | (b) | | | |
|---|---|---|---|---|---|---|---|---|---|
| | Q | C | F1 | 1F2 | | Q | C | F1 | 0F2 |
| 1 | 1 | 0 | 0 | 0 | 3 | 1 | 0 | 0 | 1 |
| 2 | 1 | 0 | 1 | 0 | 4 | 1 | 0 | 1 | 1 |
| 5 | 0 | 0 | 0 | 1 | 7 | 0 | 0 | 0 | 1 |
| 6 | 0 | 0 | 1 | 0 | 8 | 0 | 0 | 1 | 1 |
| 9 | 0 | 1 | 0 | 0 | | | | | |
| 10 | 0 | 1 | 1 | 1 | | | | | |

| Rule | (c) | | | | Rule | (d) | | | |
|---|---|---|---|---|---|---|---|---|---|
| | Q | C | F2 | 1F1 | | Q | C | F2 | 0F1 |
| 1 | 1 | 0 | 0 | 0 | 2 | 1 | 0 | 0 | 1 |
| 3 | 1 | 0 | 1 | 1 | 4 | 1 | 0 | 1 | 0 |
| 5 | 0 | 0 | 0 | 0 | 6 | 0 | 0 | 0 | 1 |
| 7 | 0 | 0 | 1 | 0 | 8 | 0 | 0 | 1 | 0 |
| 9 | 0 | 1 | 0 | 1 | 10 | 0 | 1 | 0 | 1 |

In utilizing the shifting and correcting functions of Nelson it will be noted that when T is equal to 0 (no correction being performed) the signals in the correcting network are shifted forward. This means that signal R*b* as represented by the result-from-carry function $Q.C+\bar{Q}.\bar{C}$ is shifted into flip-flop F2 and that signal $F^2$ is shifted into flip-flop F1. Utilizing Table VIII, then, the flip-flop input functions for addition are found to be:

$$1F2=\bar{T}.(Q.C+\bar{Q}.\bar{C})+T.(\bar{Q}.C.F^1+\bar{Q}.\bar{C}.\bar{F}^1)$$
$$=\bar{T}.Q.C+\bar{T}.\bar{Q}.\bar{C}+T.\bar{Q}.C.F^1+\bar{Q}.\bar{C}.\bar{F}^1$$
$$0F2=\bar{T}.(Q.\bar{C}+\bar{Q}.C)+T.(1)$$
$$=Q.\bar{C}+\bar{Q}.C+T$$
$$1F1=\bar{T}.F^2+T.(Q.F^2+C)$$
$$=\bar{T}.F^2+Q.F^2+T.C$$
$$0F1=\bar{T}.\bar{F}^2+T.\bar{F}^2$$
$$=\bar{F}^2$$

Table VIII indicates the pattern in which the F2 and F1 flip-flops are triggered at correction time $t_4$ to convert from the binary pattern to a binary-coded decimal representation. The second vertical column of Table VIII indicates the decimal sum of the binary-coded decimal quantity $A_1$, $A_2$, $A_3$ and $A_4$ and the binary-coded decimal quantity $B_1$, $B_2$, $B_3$ and $B_4$. Since each of the binary-coded quantities A and B may have decimal values between "0" and "9," the decimal sum may have a range between "0" and "18." An additional carry of "1" may occur from the arithmetic combination of the previous binary-coded decimal quantities A and B so that the range of decimal values may extend from "0" to "19."

In Table VIII, only the second, third and fourth binary digits of the binary sum of A and B are shown. These binary digits are represented as $Sb_2$, $Sb_3$ and $Sb_4$. The value of $Sb_4$ is indicated by a pattern of signals representing the binary carry C from the previous position and the comparison value Q from the previous position. The binary value of $Sb_4$ is "1" when both Q and C are "0" or both Q and C are "1." Similarly, the binary value of $Sb_4$ is "0" when only one of the quantities Q and C is true and the other quantity is false.

In each horizontal row in Table VIII, the signals $Sb_2$, $Sb_3$ and $Sb_4$ have a pattern corresponding to the decimal value in the second vertical column of the table. For example, a decimal value of either "4" or "5" is represented by a pattern of 010 for $Sb_4$, $Sb_3$ and $Sb_2$ respectively. The decimal value is "4" when $Sb_1$ is "0" and is "5" when $Sb_1$ is "1." Similarly, a decimal value of either "14" or "15" is represented by a pattern of 111 for $Sb_4$, $Sb_3$ and $Sb_2$ respectively. A decimal value of "18" or "19" is represented by a pattern of 001 for $Sb_4$, $Sb_3$ and $Sb_2$ respectively and a binary carry of "1" from the position $Sb_4$ to the next position.

The vertical columns designating $Rd_4$ and $Rd_3$ indicate the desired binary-coded pattern for the two digits of greatest significance when the decimal sums have the different values set forth in the second column of Table VIII. For example, a decimal value of either "8" or "9" is represented by a binary pattern of 1000 or 1001, where the least significant digit is at the right. In either case, the second, third and fourth most significant digits respectively have values of "0," "0" and "1." Similarly, decimal values of "14" and "15" are respectively represented by patterns of 1110 and 1111, where the least significant digit is at the right.

As may be seen from Tables VIII and VIII–A, the binary values $Sb_2$ and $Sb_3$ are respectively indicated by the pattern of operation of the F1 and F2 flip-flops at the end of the $t_3$ time interval. The F1 and F2 flip-flops indicate the two most significant digits $Sd_3$ and $Sd_4$ on a binary-coded decimal basis at the end of the correction time interval $t_4$. The required introduction of signals to the F1 and F2 flip-flops during the $t_4$ time interval is indicated in the last four vertical columns of Table VIII. The triggering signals introduced to the F1 flip-flop are indicated in two vertical columns and the triggering signals introduced to the F2 flip-flop are indicated in two vertical columns. For example, the F2 flip-flop has a first vertical column designated "1F2" and a second vertical column designated as "0F2." The column "1F2" indicates a true state of operation and the column 0F2 indicates a false state of operation. When the F2 flip-flop has to be triggered from the true state of operation to the false state of operation, an indication of "1" is placed under the column designated as "0F2." Similarly, when the flip-flop must remain in the true state of operation, an indication of "0" is placed in the column designated as 0F2. This indication of "0" shows that under no circumstances can a triggering signal be introduced to the flip-flop to produce the false state of operation.

By way of illustration, in rule 3 the F2 flip-flop must be changed from a true state of operation at the end of the $t_3$ time interval to a false state of operation at the end of the $t_4$ time interval. This may be seen by comparing the $Sb_3$ and $Rd_4$ columns. At such times, a triggering signal indicated by a binary value of "1" must be introduced to the 0F2 terminal. In rule 1, the F2 flip-flop is false at the end of the $t_3$ time interval and it must remain false at the end of the $t_4$ interval. In order to obtain this state of operation of the F2 flip-flop, no signal can be introduced to the 1F2 terminal, as represented by an indication of "0" in the first horizontal row under the column 1F2.

The logical equations controlling the operation of the F1 and F2 flip-flops may now be seen from Table VIII and the previous discussion. As will be seen from rule 5, the F2 flip-flop is triggered from the false state to the true state at the $t_4$ correction time interval when Q, C and F1 are all simultaneously false. The F2 flip-flop is also triggered true when Q is false and C and F1 are simultaneously true in accordance with rule 10. This causes an expression $1F2=T.\bar{Q}.C.F1+T.\bar{Q}.\bar{C}.\bar{F}1$ to be obtained. During the time intervals $t_1$, $t_2$ and $t_3$, T is false. Upon the occurrence of such time intervals, 1F2 is triggered in accordance with the first term of Equation 20F2 set forth above. This equation may be written as:

$$1F2=\bar{E}.(Q.C+\bar{Q}.\bar{C})=\bar{T}.(Q.C+\bar{Q}.\bar{C})$$

The logic controlling the triggering of the F2 flip-flop to the false state at the correction time interval $t_4$ may also be seen from Table VIII. As will be seen from rules 3, 4, 7 and 8, the F2 flip-flop is triggered from the true state to the false state every time that the F2 flip-flop has a true state during the $t_4$ time interval. Because of this, $0F2=T.\bar{F}2$. During the $t_1$, $t_2$ and $t_3$ time intervals, the F2 flip-flop is triggered false in a manner similar to that expressed in Equation 20F2. This triggering may be expressed as $0F2=\bar{E}.(Q.\bar{C}+\bar{Q}.C)=\bar{T}.(Q.\bar{C}+\bar{Q}.C)$.

Table VIII also provides an indication as to the manner in which the F1 flip-flop is triggered to the true state at the correction time interval $t_4$. As may be seen from rule 3, the F1 flip-flop is triggered true at the $t_4$ time interval when Q and F2 are simultaneously true. The F1 flip-flop is also triggered true from the false state in accordance with rule 9 when C is true at the correction time interval $t_4$. The inclusion of the logic $T.C.$ would be normally expected to cover rule 10. However, it will be hereafter seen from the logic for 0F2 that the F1 flip-flop will be triggered from the true state to the false state in accordance with such logic. For this reason, the triggering of the F1 flip-flop to the true state at the correction time interval $t_4$ can be expressed $$1F1=T.(Q.F^2+C)$$

In accordance with the logic expressed in Equation 20F1, the triggering of the F1 flip-flop to the true state at time intervals $t_1$, $t_2$ and $t_3$ can be expressed as $$1F1=\bar{E}.F^2=\bar{T}.F^2$$

As may be seen from Table VIII, the F1 flip-flop is triggered from the true state to the false state at the correction time interval $t_4$ every time that F2 is false during this time interval. This includes rules 2, 6 and 10. For this reason, the logic for triggering the F1 flip-flop to the false state at time interval $t_4$ can be expressed as $$0F2=T.\bar{F}^2$$

The logic for triggering the F1 flip-flop to the false state in the time intervals other than $t_4$ is obtained from Equation 20F1 and may be expressed as $0F2=\bar{E}.\bar{F}^2=\bar{T}.\bar{F}^2$.

In a similar manner the correction functions for subtraction may be derived from Table IX as follows:

*Table IX*

| Rule | Difference | $Db^4$ Q | $Db^4$ C | $Db^3$ F2 | $Db^2$ F1 | $Rd^4$ F2′ | $Rd^3$ F1′ | C′ | 1F2 | 0F2 | 1F1 | 0F1 |
|---|---|---|---|---|---|---|---|---|---|---|---|---|
| 1 | −(9, 0) | 0 | 1 | 1 | 1 | 0 | 0 | 1 | --- | 1 | --- | 1 |
| 2 | −(7, 8) | 1 | 1 | 0 | 0 | 0 | 0 | 1 | 0 | --- | 0 | -- |
| 3 | −(5, 6) | 1 | 1 | 0 | 1 | 0 | 1 | 1 | 0 | --- | --- | 0 |
| 4 | −(3, 4) | 1 | 1 | 1 | 0 | 0 | 1 | 1 | --- | 1 | 1 | -- |
| 5 | −(1, 2) | 1 | 1 | 1 | 1 | 1 | 0 | 1 | --- | 0 | --- | 1 |
| 6 | (0, 1) | 1 | 0 | 0 | 0 | 0 | 0 | 0 | 0 | --- | 0 | -- |
| 7 | (2, 3) | 1 | 0 | 0 | 1 | 0 | 0 | 0 | 0 | --- | --- | 1 |
| 8 | (4, 5) | 1 | 0 | 1 | 0 | 0 | 1 | 0 | --- | 1 | 1 | -- |
| 9 | (6, 7) | 1 | 0 | 1 | 1 | 0 | 1 | 0 | --- | 1 | --- | 0 |
| 10 | (8, 9) | 0 | 0 | 0 | 0 | 1 | 0 | 0 | 1 | --- | 0 | -- |

*Table IX—Continued*

| Rule | (a) Q | C | F1 | 1F2 | Rule | (b) Q | C | F1 | 0F2 |
|---|---|---|---|---|---|---|---|---|---|
| 2 | 1 | 1 | 0 | 0 | 1 | 0 | 1 | 1 | 1 |
| 3 | 1 | 1 | 1 | 0 | 4 | 1 | 1 | 0 | 1 |
| 6 | 1 | 0 | 0 | 0 | 5 | 1 | 1 | 1 | 0 |
| 7 | 1 | 0 | 1 | 0 | 8 | 1 | 0 | 0 | 1 |
| 10 | 0 | 0 | 0 | 1 | 9 | 1 | 0 | 1 | 1 |

| Rule | (c) Q | C | F2 | 1F1 | Rule | (d) Q | C | F2 | 0F1 |
|---|---|---|---|---|---|---|---|---|---|
| 2 | 1 | 1 | 0 | 0 | 1 | 0 | 1 | 1 | 1 |
| 4 | 1 | 1 | 1 | 1 | 3 | 1 | 1 | 0 | 0 |
| 6 | 1 | 0 | 0 | 0 | 5 | 1 | 1 | 1 | 1 |
| 8 | 1 | 0 | 1 | 1 | 7 | 1 | 0 | 0 | 1 |
| 10 | 0 | 0 | 0 | 0 | 9 | 1 | 0 | 1 | 0 |

$$1F2=\bar{T}.(Q.C+\bar{Q}.\bar{C})+T.\bar{Q}.\bar{C}$$
$$=\bar{T}.Q.C+\bar{Q}.\bar{C}$$
$$0F2=\bar{T}.(Q.\bar{C}+\bar{Q}.C)+T.(\bar{Q}+\bar{C}+\bar{F}^1)$$
$$=Q.\bar{C}+\bar{Q}.C+T.(\bar{Q}+\bar{C}+\bar{F}^1)$$
$$1F1=\bar{T}.F^2+T.F^2=F^2$$
$$0F1=\bar{T}.\bar{F}^2+T.(C.F^2+\bar{C}.\bar{F}^2)$$

The logic set forth immediately above may be seen from Table IX. As may be seen in Table IX, the F2 flip-flop is triggered from the false state to the true state only in accordance with rule 10. The logic expressing such triggering may be expressed as $1F2=T.\bar{Q}.\bar{C}$. The triggering of the F2 flip-flop to the true state in time intervals $t_1$, $t_2$ and $t_3$ is similar to that expressed above in the equations after Table VIII.

The F2 flip-flop is triggered false at correction time interval $t_4$ in accordance with rules 1, 4, 8 and 9 of Table IX. This occurs when either Q, C or F1 is false at the correction time interval $t_4$. This can be expressed as $0F2=T.(\bar{Q}+\bar{C}+\bar{F}1)$. As will be seen, this logic does not cover rule 5 of Table IX since the F2 flip-flop must remain true in accordance with this rule. The logic does not cover rule 5 since neither Q, C nor F1 is true at time interval $t_4$. The failure to cover rule 5 in the logic is appropriate since the F2 flip-flop should remain in the true state in accordance with rule 5.

Rules 4 and 8 indicate that the F1 flip-flop is triggered from a false state to a true state at correction time interval $t_4$ when the F2 flip-flop is true. This logic may be expressed as $1F1=T.F^2$. It will be seen that this logic does not cover rules 3, 5 and 9 since the F1 flip-flop is already in the true state at the beginning of correction time interval $t_4$.

In accordance with rules 1, 5 and 7 of Table IX, the F1 flip-flop is triggered from the true state to the false state at correction time interval $t_4$. This occurs when both C and F2 are simultaneously true or when both C and F2 are simultaneously false. This may be expressed as $0F1=T.(C.F^2+\bar{C}.\bar{F}^2)$. As it will be seen, the logic set forth in the previous equation also covers rules 4, 6 and 10. These situations do not produce any errors since the F1 flip-flop remains false from time interval $t_3$ to time interval $t_4$ in these situations.

Introducing the signals S and $\bar{S}$ the combined add-subtract functions may be expressed as follows:

$$1F2=\bar{T}.Q.C+\bar{Q}.\bar{C}.(\bar{S}+\bar{T})+S.(T.\bar{Q}.C.F^1+\bar{Q}.\bar{C}.\bar{F}^1)$$
$$0F2=Q.\bar{C}+\bar{Q}.C+T.(\bar{Q}+\bar{C}+\bar{F}^1+S)$$

$$1F1=F^2.(\bar{S}+\bar{T}+Q)+S.T.C$$
$$0F1=\bar{F}^2.(S+\bar{T}+\bar{C})+\bar{S}.T.C.F^2$$

Since the 0 input function for flip-flop F2 appears similar to the complement of its 1 input function a "setting" function is more economical, although a complementer circuit is required. The combined add-subtract "setting" function for flip-flop F2 may be derived from Tables VIII and IX as follows:

$$t_0F2=T.(Q.C+\bar{Q}.\bar{C})+\bar{S}.T.(\bar{Q}.\bar{C}.\bar{F}^2.\bar{F}^1+C.\bar{F}^2.F^1)+S.T.(Q.C.F^2.F^1+\bar{Q}.\bar{F}^2)$$
$$=Q.C.(\bar{T}+S.F^2.F^1)+\bar{Q}.\bar{C}.(\bar{T}+\bar{S}.\bar{F}^2.\bar{F}^1)+\bar{F}^2.(T.\bar{S}.C.F^1+S.T.\bar{Q})$$
$$=Q.C.\bar{T}+Q.C.S.F^2.F^1+\bar{Q}.\bar{C}.\bar{T}+\bar{Q}.\bar{C}.\bar{S}.\bar{F}^2.\bar{F}^1+\bar{F}^2.T.\bar{S}.C.F^1+\bar{F}^2.S.T.\bar{Q}$$

it is believed that the setting expression $t_0F2$ may be derived by a person skilled in the art from Tables VIII and IX and from the above discussions. This is especially true in view of the discussions above for the partial changing functions 1F2, 0F2, 1F1 and 0F1 for the circuitry shown in Figure 3 and in view of the previous discussions defining and exemplifying setting functions. A mechanization of these functions is illustrated in Fig. 3 wherein gating circuits 30C, 30Q, 30R, 30F1 and 30F2 are mechanized according to the following functions:

$$(30C)\ 1C=[\bar{S}.A.B+\bar{S}.Cd.(A+B)+S.\bar{A}.B].Cp$$
$$=[\bar{S}.A.B+(\bar{S}.T.\bar{Q}.F^2+\bar{S}.T.\bar{Q}.F^1).(A+B)+S.\bar{A}.B].Cp$$
$$=(\bar{S}.A.B+\bar{S}.T.\bar{Q}.F^2.A+\bar{S}.T.\bar{Q}.F^2.B+\bar{S}.T.\bar{Q}.F^1.A+S.T.\bar{Q}.F^1.B+S.\bar{A}.B).Cp$$
$$0C=(\bar{S}.\bar{A}.\bar{B}+S.A.\bar{B}).Cp$$

$$(30Q)\ t_0Q=[\overline{Cd}.\bar{A}.\bar{B}.\bar{C}+A.B.(Cd+C)+S.(B.\bar{C}+\bar{B}.C)].Cp$$
$$=[(\bar{T}+Q+\bar{F}^2.\bar{F}^1).\bar{A}.\bar{B}.\bar{C}+A.B.(T.\bar{Q}.F^2+T.\bar{Q}.F^1+C)+S.(B.\bar{C}+\bar{B}.C)]$$
$$=(\bar{T}.\bar{A}.\bar{B}.\bar{C}+Q.\bar{A}.\bar{C}.\bar{B}+\bar{F}^2.\bar{F}^1.\bar{A}.\bar{B}.\bar{C}+A.B.T.\bar{Q}.F^2+A.B.T.\bar{Q}.F^1+A.B.C.+S.B.\bar{C}+S.\bar{B}.C).Cp$$

$$(30R)\ Rd=E.\bar{F}^1+\bar{E}.F^1$$
$$=(T.C+T.\bar{Q}.F^2+T.\bar{Q}.F^1)\bar{F}^1+(\bar{T}+\bar{C}.Q+\bar{C}.\bar{F}^2.\bar{F}^1)F^1$$
$$=T.C.\bar{F}^1+T.\bar{Q}.F^2.\bar{F}^1+\bar{T}.F^1+Q.F^1$$

(30F1)

$$1F1=(F^2.\bar{S}+F^2.\bar{T}+F^2.Q+S.T.C).Cp$$
$$0F1=(\bar{F}^2.S+\bar{F}^2.\bar{T}+\bar{F}^2.\bar{C}+\bar{S}.T.C.F^2).Cp$$

$$(30F2)\ t_0F2=(Q.C.\bar{T}+Q.C.S.F^2.F^1+\bar{Q}.\bar{C}.\bar{T}+\bar{Q}.\bar{C}.\bar{S}.\bar{F}^2.\bar{F}^1+\bar{F}^2.T.\bar{S}.C.F^1+\bar{F}^2.S.T.\bar{Q}).Cp$$

The initial equation for 1C corresponds to Equation 20C set forth above. The final expression for 1C for Equation 30C is obtained by substituting the logic for *Cd* in Equation 20C. The expression for *Cd* is set forth above between Equation 20Q and 20R. The equation for $t_0$Q in the first line of Equation 30Q corresponds to Equation 20Q representative of $t_0$Q. The final expression for $t_0$Q in Equation 30Q is obtained by substituting the logic for *Cd* and $\overline{Cd}$ in Equation 20Q. The equations for *Cd* and $\overline{Cd}$ are set forth above between Equations 20Q and 20R.

Equation 30R corresponds in the first line to Equation 20R. The final logic of Equation 30R is obtained by recognizing that $Cd=E$ and $Cd=\bar{E}$ and by substituting the logic for *Cd* and *Cd* in Equation 20R.

The circuit shown in Fig. 3 is mechanized according to gating functions requiring only two levels, and thus is suitable for use in a system where low power flip-flops are utilized such as flip-flop comprising miniature tubes or transistors. It will be understood, however, that for certain applications it may be desirable to mechanize a factored form of the equations in order to economize on gating elements. The manner in which the circuit of Fig. 3 is mechanized according to these functions should be apparent from the examples considered.

Perhaps the most attractive feature of the result-from-carry adder-subtractor is that when it is utilized in combination with binary-coded decimal correction circuits, the correction operation may be divided into two parts, on a time-sharing basis. As a timing convention it is assumed that the two divisions of the correction are represented by the signals $T^3=1$ and $T^4=1$. When $T^3$ is 1, signals $Rb^1$ and $Rb^2$ are in flip-flops F1 and F2 shown in Fig. 4 and flip-flops Q and C produce signals indicating $Rb^3$. The signal $Rb^4$ must then be determined as a function of input signals A and B and the carry signal C; $Rb^4$ being 1 whenever one of A, B and C is 1 or all signals A, B and C are 1.

Figure 4:
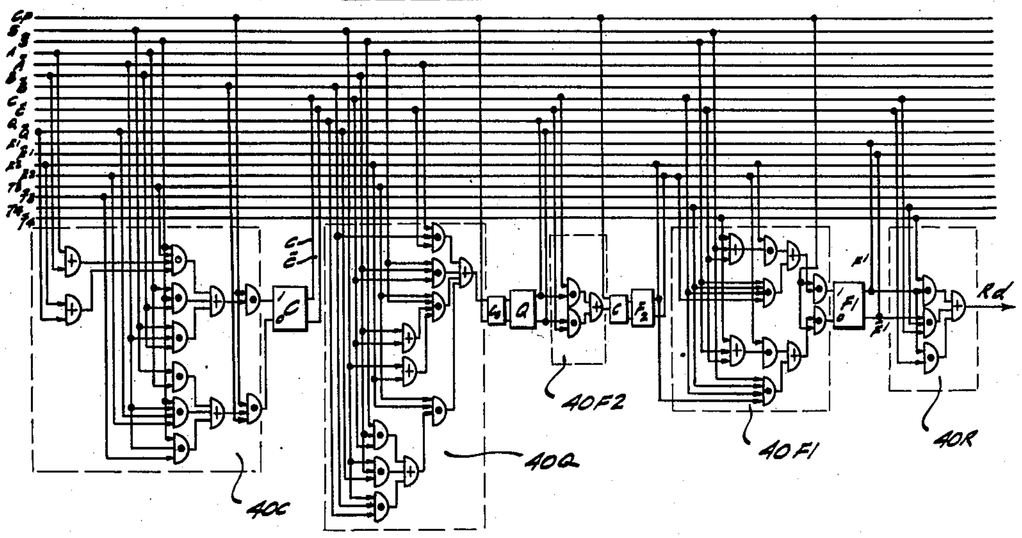
Fig. 4 is a schematic diagram of a binary-coded decimal adder-subtracter wherein the true binary to decimal correction is performed on a time-sharing basis.

Table IX-A indicates the time sequence for presenting and combining the various signals in the embodiment shown in Figure 4.

The gating functions required to produce the decimal carry signal (represented as C′ below) and a comparison signal corresponding to the fourth decimal digit, at the time that $T^3$ is equal to 1 are derived from Tables X and XI shown below. It is considered that the manner of derivation should be apparent from the procedure outlined above.

*Table X*

$Sb^3=Q.C+Q.C$ $T^3=1$ $T^4=1$

| Rule | Sum | $A_4$ | $B_4$ | $C_3$ | $Q_3$ | $Sb^2=F^2$ | $Sb^3$ | $Sb^4$ | Cd | $Qd_4$ | $Sd_4$ | IC | 0C | 1Q | 0Q |
|---|---|---|---|---|---|---|---|---|---|---|---|---|---|---|---|
| 1 | (0, 1) | 0 | 0 | 0 | 1 | 0 | 0 | 0 | 0 | 1 | 0 | 0 | ---- | ---- | 0 |
| 2 | (2, 3) | 0 | 0 | 0 | 1 | 1 | 0 | 0 | 0 | 1 | 0 | 0 | ---- | ---- | 0 |
| 3 | (4, 5) | 0 | 0 | 0 | 0 | 0 | 1 | 0 | 0 | 1 | 0 | 0 | ---- | 1 | ---- |
| 4 | (6, 7) | 0 | 0 | 0 | 0 | 1 | 1 | 0 | 0 | 1 | 0 | ---- | ---- | 1 | ---- |
| 5 | (8, 9) | 0 | 0 | 1 | 0 | 0 | 0 | 1 | 0 | 0 | 1 | ---- | 1 | 0 | ---- |
| | (8, 9) | 0 | 1 | 0 | 1 | 0 | 0 | 1 | 0 | 0 | 1 | 0 | ---- | ---- | 1 |
| | (8, 9) | 1 | 0 | 0 | 1 | 0 | 0 | 1 | 0 | 0 | 1 | 0 | ---- | ---- | 1 |
| 6 | (10, 11) | 0 | 0 | 1 | 0 | 1 | 0 | 1 | 1 | 0 | 0 | ---- | 0 | 0 | ---- |
| | (10, 11) | 0 | 1 | 0 | 1 | 1 | 0 | 1 | 1 | 0 | 0 | 1 | ---- | ---- | 1 |
| | (10, 11) | 1 | 0 | 0 | 1 | 1 | 0 | 1 | 1 | 0 | 0 | 1 | ---- | ---- | 1 |
| 7 | (12, 13) | 0 | 0 | 1 | 1 | 0 | 1 | 1 | 1 | 0 | 0 | ---- | 0 | ---- | 1 |
| | (12, 13) | 0 | 1 | 0 | 0 | 0 | 1 | 1 | 1 | 0 | 0 | 1 | ---- | 0 | ---- |
| | (12, 13) | 1 | 0 | 0 | 0 | 0 | 1 | 1 | 1 | 0 | 0 | 1 | ---- | 0 | ---- |
| 8 | (14, 15) | 0 | 0 | 1 | 1 | 1 | 1 | 1 | 1 | 0 | 0 | ---- | 0 | ---- | 1 |
| | (14, 15) | 0 | 1 | 0 | 0 | 1 | 1 | 1 | 1 | 0 | 0 | 1 | ---- | 0 | ---- |
| | (14, 15) | 1 | 0 | 0 | 0 | 1 | 1 | 1 | 1 | 0 | 0 | 1 | ---- | 0 | ---- |
| 9 | (16, 17) | 0 | 1 | 1 | 0 | 0 | 0 | 0 | 1 | 0 | 0 | ---- | 0 | 0 | ---- |
| | (16, 17) | 1 | 0 | 1 | 0 | 0 | 0 | 0 | 1 | 0 | 0 | ---- | 0 | 0 | ---- |
| | (16, 17) | 1 | 1 | 0 | 1 | 0 | 0 | 0 | 1 | 0 | 0 | 1 | ---- | ---- | 1 |
| 10 | (18, 19) | 0 | 1 | 1 | 0 | 1 | 0 | 0 | 1 | 1 | 1 | ---- | 0 | 1 | ---- |
| | (18, 19) | 1 | 0 | 1 | 0 | 1 | 0 | 0 | 1 | 1 | 1 | ---- | 0 | 1 | ---- |
| | (18, 19) | 1 | 1 | 0 | 1 | 1 | 0 | 0 | 1 | 1 | 1 | 1 | ---- | ---- | 0 |

$$1Q=\bar{T}^3.(\bar{A}.\bar{B}.\bar{C}+A.B.C)+T^3.[\bar{A}.\bar{B}.\bar{C}+(A+B)C.F^2]$$
$$=\bar{A}.\bar{B}.\bar{C}+\bar{T}^3.A.B.C+T^3.(A+B).C.F^2$$
$$0Q=(A+B+C).(\bar{A}+\bar{B}+\bar{F}^2)$$
$$t0Q=\bar{A}.\bar{B}.\bar{C}+A.B.C+T^3.F^2.(A.B+A.C+B.C)$$
$$1C=A.B+T^3.(F^2+\bar{Q}).(A+B)$$
$$0C=\bar{A}.\bar{B}.(\bar{T}^3+\bar{Q}.\bar{F}^2)$$

The left portion of Table X indicates how the various signals are combined at correction time interval $t_3$. This may be seen by the indication of $t_3=1$. At this correction time interval, the quantities $A_4$, $B_4$, $C_3$, $Q_3$ and $Rb_2$ are combined in accordance with Table IX-A. These quantities are indicated respectively in the 3rd, 4th, 5th, 6th and 7th vertical columns of Table X. The 8th and 9th vertical columns respectively designated as $Sb_4$ and $Sb_3$ are included on an implied basis to indicate the possible binary combinations of the input quantities A and B so that the proper values of the decimal carry *Cd* and the comparison quantity $Qd_4$ can be determined.

As will be seen, a decimal carry of "1" is obtained when the binary sum of the input quantities A and B has a decimal value greater than 10. The C flip-flop is triggered true at such times in accordance with the logical expression $$1C=A.B+T^3.(F^2+\bar{Q}).(A+B)$$

This equation indicates that the C flip-flop is triggered true at time $t_3$ when either F2 is true or Q is false at the time that either A or B is true. This covers all situations except the first horizontal rows of rules 6, 7 and 8 and the last horizontal row of rule 9. In order to include the last horizontal row of rule 9, the term A.B is included. The term $t_3$ is not included in A.B. since a carry is obtained when both A and B are true regardless of whether the correction time interval $t_3$ is being presented or a different time interval is being presented. No special logic has to be included for the first horizontal rows of rules 6, 7 and 8 since the C flip-flop is initially true and remains true for these situations.

A decimal carry of "0" occurs when the sum of the input quantities A and B has a decimal sum less than "10." As may be seen by comparing the operational state of Q at the beginning of $t_3$ with the operational state of Q at the beginning of $t_4$, the C flip-flop remains false in all possible combinations of signals except for the first horizontal column of rule 5. The logic controlling the triggering of the C flip-flop from the true state to the false state in the first horizontal column of rule 5 may be expressed as $0C=\bar{A}.\bar{B}.\bar{Q}.\bar{F}^2$. The logic controlling the triggering of the C flip-flop to the false state at times other than $t_3$ may be expressed as $$0C=\bar{A}.\bar{B}.\bar{T}^3$$

in accordance with the logic previously set forth in Equation 10C.

Certain of the rules set forth in Table X have more than one possible combination of signals. For example, each of rules 5 to 10 inclusive has three different possibilities of combination. Rule 5 will be considered by way of illustration. It will be seen that the combinations of $Sb_2$, $Sb_3$ and $Sb_4$ remain the same for each of the three variations of rule 5 since $Sb_2$, $Sb_3$ and $Sb_4$ indicate a binary sum of either "8" or "9." Because of the fact that $Sb_3$ is "0" in rule 5, either $Q_3$ or $C_3$ must be "1" but both Q and C cannot be simultaneously "1" or "0." Furthermore, a binary value of "8" or "9" can be obtained by having either $A_4$ or $B_4$ be "1" but by not having both $A_4$ and $B_4$ be "1." This results from the fact that $A_4$ has a binary value of "8" and $B_4$ has a binary value of "8." A decimal value of "8" can also be obtained by having $A_4$ and $B_4$ be "0" since values of "8" can be obtained by adding decimal values of "4" and "4" and other combinations of two numbers each less than "8."

The vertical column designated as $Sd^4$ in Table X indicates the binary value of the digit of greatest significance when the binary sum of the two quantities A and B has been converted to a binary-coded decimal basis. For example, $Sd_4$ has a binary value of "1" for decimal values of "8" or "9." However, for values between "10" and "16" $Sd_4$ has a value of "0" since the decimal value is indicated by combinations of signals for $Sd_3$, $Sd_2$ and $Sd_1$ and a decimal carry of "1" for *Cd* to the first binary digit of the next decimal number. Decimal values of "18" or "19" are indicated by a binary value of "1" for $Sd_4$ and a carry of "1" for $Cd$.

The value of $Sd_4$ is determined by a combination of $Cd$ and $Qd_4$. As may be seen in Table X, a binary value of "1" for $Sd_4$ is obtained when both $Cd$ and $Qd_4$ are "0" or when both $Cd$ and $Qd_4$ are "1." Table X also indicates that a binary value of "0" is obtained for $Sd_4$ when one of the quantities $Cd$ and $Qd_4$ is "1" and the other quantity is "0." In this way, the binary value of $Qd_4$ for each rule in Table X can be determined from the binary values of $Cd$ and $Sd_4$.

The proper value of $Qd_4$ can be determined at correction time interval $t_3$ by the proper combinations of signals $A_3$, $B_3$, $C_3$ and $F_2$. For example, $Qd_4$ becomes "1" or remains "1" in rules 1 to 4, inclusive, when $A_4$, $B_4$ and $C_3$ are simultaneously false. The Q flip-flop also becomes true or remains true in accordance with all of the examples of rule 10 when $F_2$ is true at the time that at least two of the quantities $A_4$, $B_4$ and $C_3$ are true. This can be written as $$t0Q=\bar{A}.\bar{B}.\bar{C}+T^3.F2.(A.B+A.C+B.C)$$

The Q flip-flop becomes triggered false under certain circumstances in the correction time interval $t_3$ to indicate a value of "0" for $Qd_4$. This occurs in rules 5 to 9, inclusive of Table X. As will be seen, either A or B or C is true in each of these rules. Furthermore, at least one of the quantities A, B and F2 is false in each of these rules. Because of this, the Q flip-flop becomes triggered false in accordance with the logical expression $0Q=(A+B+C).(\bar{A}+\bar{B}+\bar{F}^2)$.

*Table XI*

$T^3=1$ $T^4=1$

| Rule | Stored values | | | | | Implied values | | | | | | | | |
|---|---|---|---|---|---|---|---|---|---|---|---|---|---|---|
| | Difference | $A_4$ | $B_4$ | $C_3$ | $Q_3$ | $Db=F^2$ | $Db^3$ | $Db^4$ | $Cd$ | $Qd_4$ | $Dd^4$ | IC | OC | IQ | OQ |
| 1 | −(9, 0) | 0 | 1 | 1 | 1 | 1 | 1 | 0 | 1 | 0 | 0 | ---- | 0 | ---- | 1 |
| 2 | −(7, 8) | 0 | 0 | 1 | 0 | 0 | 0 | 1 | 1 | 0 | 0 | ---- | 0 | 0 | ---- |
| | −(7, 8) | 0 | 1 | 0 | 1 | 0 | 0 | 1 | 1 | 0 | 0 | 1 | ---- | ---- | 1 |
| 3 | −(5, 6) | 0 | 0 | 1 | 0 | 1 | 0 | 1 | 1 | 0 | 0 | ---- | 0 | 0 | ---- |
| | −(5, 6) | 0 | 1 | 0 | 1 | 1 | 0 | 1 | 1 | 0 | 0 | 1 | ---- | ---- | 1 |
| 4 | −(3, 4) | 0 | 0 | 1 | 1 | 0 | 1 | 1 | 1 | 0 | 0 | ---- | 0 | ---- | 1 |
| | −(3, 4) | 0 | 1 | 0 | 0 | 0 | 1 | 1 | 1 | 0 | 0 | 1 | ---- | 0 | ---- |
| 5 | −(1, 2) | 0 | 0 | 1 | 1 | 1 | 1 | 1 | 1 | 1 | 1 | ---- | 0 | ---- | 0 |
| | −(1, 2) | 0 | 1 | 0 | 0 | 1 | 1 | 1 | 1 | 1 | 1 | 1 | ---- | 1 | ---- |
| | −(1, 2) | 1 | 1 | 1 | 1 | 1 | 1 | 1 | 1 | 1 | 1 | ---- | 0 | ---- | 0 |
| 6 | (0, 1) | 0 | 0 | 0 | 1 | 0 | 0 | 0 | 0 | 1 | 0 | 0 | ---- | ---- | 0 |
| | (0, 1) | 1 | 0 | 1 | 0 | 0 | 0 | 0 | 0 | 1 | 0 | ---- | 1 | 1 | ---- |
| | (0, 1) | 1 | 1 | 0 | 1 | 0 | 0 | 0 | 0 | 1 | 0 | 0 | ---- | ---- | 0 |
| 7 | (2, 3) | 0 | 0 | 0 | 1 | 1 | 0 | 0 | 0 | 1 | 0 | 0 | ---- | ---- | 0 |
| | (2, 3) | 1 | 0 | 1 | 0 | 1 | 0 | 0 | 0 | 1 | 0 | ---- | 1 | 1 | ---- |
| 8 | (4, 5) | 0 | 0 | 0 | 0 | 0 | 1 | 0 | 0 | 1 | 0 | 0 | ---- | 1 | ---- |
| | (4, 5) | 1 | 0 | 1 | 1 | 0 | 1 | 0 | 0 | 1 | 0 | ---- | 1 | ---- | 0 |
| 9 | (6, 7) | 0 | 0 | 0 | 0 | 1 | 1 | 0 | 0 | 1 | 0 | 0 | ---- | 1 | ---- |
| | (6, 7) | 1 | 0 | 1 | 1 | 1 | 1 | 0 | 0 | 1 | 0 | ---- | 1 | ---- | 0 |
| 10 | (8, 9) | 1 | 0 | 0 | 1 | 0 | 0 | 1 | 0 | 0 | 1 | 0 | ---- | ---- | ---- |

$$t_0Q=\bar{T}^3.(\bar{A}.\bar{B}.\bar{C}+A.B.C.)$$

$$+T^3.[\bar{A}.\bar{B}.\bar{C}+A.B+A.C+(B.\bar{Q}+\bar{B}.Q).F^2]$$

$$=\bar{A}.\bar{B}.\bar{C}+A.B.C+T^3.(A.B+A.C+B.\bar{Q}.F^2+\bar{B}.Q.F^2)$$

$$1C=\bar{A}.B$$

$$0C=A.\bar{B}$$

Table XI is similar to Table X in the presentation of the various quantities. However, Table XI covers the subtraction of B from A whereas Table X covers the addition of B to A. Almost all of the quantities in Table XI have designations similar to those set forth in Table X. However, certain columns are designated as $Db_4$ and $Db_3$ to indicate the binary difference between A and B in the two most significant digits. A plurality of examples are also given for certain rules to cover various alternatives as set forth above in Table X and disclosed in connection with that table.

One of the columns shown in Table XI represents the decimal carry $Cd$. For negative numbers, the value of $Cd$ is "1" to indicate a negative carry from the most significant position of the first decimal digit to the least significant position of the next decimal digit. For positive values between "0" and "9," the value of the decimal carry $Cd$ is "0" to conform with the corresponding decimal values in Table X.

In accordance with rules 1 to 5, inclusive, the C flip-flop is triggered from the false state to the true state at correction time $t_3$ only when A is false at the same time that B is true. Since this same logic prevails at time intervals other than $t_3$, the term $T_3$ does not have to be included in the logic for 1C. Similarly, the C flip-flop is triggered from the true state to the false state when A is true at the time that B is false. Since this same logic prevails at time intervals other than $t_3$, the term $t_3$ does not have to be included in the logic for 0C.

At the same time the new signals C′ and Q′ are formulated, as indicated above, signals $Rb^3$ and $Rb^2$ are shifted forward into flip-flops F2 and F1, respectively. Thus, when $T^4$ is equal to 1 signals corresponding to the digits $Cd$, $Rd^4$, $Rb^3$ and $Rb^2$ are available and are then utilized to define the correction of $Rb^3$ and $Rb^2$ to the desired decimal digits $Rd^3$ and $Rd^2$, signal $Rd^3$ being entered into flip-flop F1 and signal $Rd^2$ being produced by output gating circuit 40R. It will be noted that the signal entered into flip-flop F2 is always defined as: $Q.C+\bar{Q}.\bar{C}$, since the correction is made in signals Q, $\bar{Q}$, C and $\bar{C}$ at the time $T^3$ is 1, so that no further correction is required. The gating function for flip-flop F1 and that defining signal $Rd^2$ are derived from Tables XII and XIII below, indicating addition and subtraction corrections, respectively.

*Table XII*

| Rule | Sum | $Cd$ | $Qd_4$ | $Sb^4$ | $Sb^3=F^2$ | $Sb^2=F1$ | $Sd^3=F1'$ | $Rd^2$ | 1F1 | 0F1 |
|---|---|---|---|---|---|---|---|---|---|---|
| 1 | (0, 1) | 0 | 1 | 0 | 0 | 0 | 0 | 0 | 0 | --- |
| 2 | (2, 3) | 0 | 1 | 0 | 0 | 1 | 0 | 1 | --- | 1 |
| 3 | (4, 5) | 0 | 1 | 0 | 1 | 0 | 1 | 0 | 1 | --- |
| 4 | (6, 7) | 0 | 1 | 0 | 1 | 1 | 1 | 1 | --- | 0 |
| 5 | (8, 9) | 0 | 0 | 1 | 0 | 0 | 0 | 0 | 0 | --- |
| 6 | (10, 11) | 1 | 0 | 0 | 0 | 1 | 0 | 0 | --- | 1 |
| 7 | (12, 13) | 1 | 0 | 0 | 1 | 0 | 0 | 1 | 0 | --- |
| 8 | (14, 15) | 1 | 0 | 0 | 1 | 1 | 1 | 0 | --- | 0 |
| 9 | (16, 17) | 1 | 0 | 0 | 0 | 0 | 1 | 1 | 1 | --- |
| 10 | (18, 19) | 1 | 1 | 1 | 0 | 1 | 0 | 0 | --- | 1 |

*Table XII*—Continued

| C | Q | F² | 1F1 | C | Q | F² | 0F1 |
|---|---|---|---|---|---|---|---|
| 0 | 1 | 0 | 0 | 0 | 1 | 0 | 1 |
| 0 | 1 | 1 | 1 | 0 | 1 | 1 | 0 |
| 0 | 0 | 0 | 0 | 1 | 0 | 0 | 1 |
| 1 | 0 | 1 | 0 | 1 | 0 | 1 | 0 |
| 1 | 0 | 0 | 1 | 1 | 1 | 0 | 1 |

$$Rd=\bar{T}^4.F^1+T^4.(\bar{C}.F^1+C.\bar{F}^1)$$

$$=\bar{T}^4.F^1+\bar{C}.F^1+T^4.C.\bar{F}^1$$

$$1F1=\bar{T}^4.F^2+T^4.(\bar{C}.F^2+C.\bar{F}^2)$$

$$=\bar{T}^4.F^2+\bar{C}.F^2+T^4.C.\bar{F}^2$$

$$0F1=\bar{T}^4.\bar{F}^2+T^4.\bar{F}^2=\bar{F}^2$$

Table XII indicates how the independent vertical quantities C$d$, Q$d_4$, R$b_3$ and R$b_2$ are combined at correction time interval $t_4$ to produce the dependent quantities R$d_4$ and R$d_3$. This time relationship between the different quantities may be seen from Table IX–A set forth above. The independent quantities C$d$, Q$d_4$, R$b_3$ and R$b_2$ are copied from Table X. The R$b_3$ value is stored in the F2 flip-flop at the end of correction time interval $t_3$ and R$b_2$ value is stored in the F1 flip-flop at the same time. The S$b_4$ is not actually obtained in the embodiment shown in Figure 4 but is included on an implied basis to indicate the pattern of S$b_2$, S$b_3$ and S$b_4$ for the decimal sums shown in the second vertical column of Table XII.

During correction time interval $t_4$, the signals in the F1 flip-flop are converted into a proper form to represent the second digit on a binary-coded decimal basis. This digit has a binary significance equal to a decimal value of "2" or "0." Because of this, R$d_2$ should be "1" for decimal values of "2" or "3," decimal values of "6" or "7," decimal values of "12" or "13" and decimal values of "16" or "17." Such binary indications of "1" occur for R$d_2$ at correction time interval $t_4$ when C is false at the time that F1 is true or when C is true at the time that F1 is false. This may be represented as $Rd_2=T^4.(\bar{C}.F^1+C.\bar{F}^1)$.

Upon the presentation of correction time interval $t_4$, the value S$b_3$ in the F2 flip-flop is converted to the value S$d_3$ for transfer to the F1 flip-flop. The F1 flip-flop is triggered in a pattern set forth in the vertical column designated F1′ in Table XII. As will be seen, the F1 flip-flop is triggered from a false state to a true state in accordance with rules 3 and 9. Rule 3 may be represented as $\bar{C}.F2$ and rule 9 may be represented as $C.\bar{F}2$. No logic is required for rules 4 and 8 even though S$d$3 is true for those rules since F1 continues in a true state at such times.

The F1 flip-flop is also triggered from the true state to the false state at certain times during correction time interval $t_4$. This occurs in accordance with rules 2, 6 and 10. Each rule may be characterized on a common basis in that the F2 flip-flop is false.

*Table XIII*

| Rule | $T^4=1$ Difference | $Cd=C$ | Q$d_4$ | D$b^4$ | $Db^3=F2$ | $Db^2=F1$ | $Db^3=F1'$ | R$d^2$ | 1F1 | 0F1 |
|---|---|---|---|---|---|---|---|---|---|---|
| 1 | −(9, 0) | 0 | 1 | 0 | 0 | 0 | 0 | 0 | 0 | -- |
| 2 | −(7, 8) | 0 | 1 | 0 | 0 | 1 | 0 | 1 | --- | 1 |
| 3 | −(5, 6) | 0 | 1 | 0 | 1 | 0 | 1 | 0 | 1 | -- |
| 4 | −(3, 4) | 0 | 1 | 0 | 1 | 1 | 1 | 1 | --- | 0 |
| 5 | −(1, 2) | 0 | 0 | 1 | 0 | 0 | 0 | 0 | 0 | -- |
| 6 | (0, 1) | 1 | 0 | 0 | 0 | 1 | 0 | 0 | --- | 1 |
| 7 | (2, 3) | 1 | 0 | 0 | 1 | 0 | 0 | 1 | 0 | -- |
| 8 | (4, 5) | 1 | 0 | 0 | 1 | 1 | 1 | 0 | --- | 0 |
| 9 | (6, 7) | 1 | 0 | 0 | 0 | 0 | 1 | 1 | 1 | -- |
| 10 | (8, 9) | 1 | 1 | 1 | 0 | 1 | 0 | 0 | --- | 1 |

*Table XIII*—Continued

| C | Q | F2 | 1F1 | C | Q | F2 | 0F1 |
|---|---|---|---|---|---|---|---|
| 1 | 0 | 0 | 0 | 1 | 0 | 1 | 1 |
| 1 | 0 | 1 | 1 | 1 | 0 | 0 | 0 |
| 0 | 1 | 0 | 0 | 1 | 1 | 1 | 1 |
| 0 | 1 | 1 | 1 | 0 | 1 | 0 | 1 |
| 0 | 0 | 0 | 0 | 0 | 1 | 1 | 0 |

$$Rd=\bar{T}^4.F^1+T^4.(C.\bar{F}^1+\bar{C}.F^1)$$

$$=\bar{T}^4.F^1+T^4.C.\bar{F}^1+\bar{C}.F^1$$

$$1F1=F^2$$

$$0F1=\bar{T}^4.\bar{F}^2+T^4.(C.F^2+\bar{C}.\bar{F}^2)$$

$$=\bar{T}^4.\bar{F}^2+T^4.C.F^2+\bar{C}.\bar{F}^2$$

Table XIII includes quantities similar to those shown in Table XII. However, Table XIII relates to the subtraction of the quantity B from the quantity A whereas Table XII relates to the addition of the quantity B to the quantity A. Certain of the quantities in Table XIII are obtained from Table XI. These include the quantities C$d$, Q$d_4$, D$b_4$,F2 and F1. At correction time $t_4$, the quantity D$b_2$ in flip-flop F1 is converted to the quantity D$d_2$ representing the second binary digit of the difference quantity on a binary-coded decimal basis. The quantity $Dd_2=Rd_2$ is obtained at correction time interval $t_4$ when C is true at the time that F1 is false or when C is false at the time that F1 is true. Thus $$Rd=T^4.(C.\bar{F}1+\bar{C}.F1)$$

The F1 flip-flop is triggered during correction time interval $t_4$ into a pattern of operation representing the third digit of the difference quantity on a binary-coded decimal basis. Since this digit has a weighted significance of "4" or "0," the F1 flip-flop should be triggered true for decimal values of "4" to "7," inclusive. The F1 flip-flop should also be triggered true for negative values of "3" to "6," inclusive, since these decimal values are equivalent to positive values of "6" to "3," inclusive, and a decimal carry of −1 when the decimal complements of the numbers are obtained. It will be seen from Table XIII that the F1 flip-flop is triggered true from a false state in accordance with rules 4 and 8 and that the F1 flip-flop remains true in accordance with rules 3 and 9. In each of rules 4 and 8, the F2 flip-flop is true such that $1F1=F2$. The F1 flip-flop is triggered false in accordance with rules 1, 5 and 7. In rules 1 and 5, C and F2 are simultaneously true, and C and F2 are simultaneously false in rule 7. Thus $$0F1=T^4.(C.F^2+\bar{C}.\bar{F}^2)$$

And the combined adder-subtracter functions defining gating circuits 40C, 40Q, 40R, 40F1 and 40F2 shown in Fig. 4 may be expressed as follows:

(40C) $1C=[\bar{S}.T^3.(A+B).(F^2+\bar{Q})+\bar{S}.A.B+S.\bar{A}.B].Cp$ $0C=[\bar{B}.(S.A+\bar{S}.\bar{A}.\bar{Q}.\bar{F}^2+\bar{S}.\bar{A}.\bar{T}^3)].Cp$ (40Q) $t_0Q=[\bar{A}.\bar{B}.\bar{C}+A.B.C+T^3.A.(B+C).(S+F^2)+F^2.T^3.(\bar{S}.B.C+S.B.\bar{Q}+S.\bar{B}.Q].Cp$ (40R) $$Rd=\bar{T}^4.F^1+T^4.C.\bar{F}^1+\bar{O}.F^1$$

(40F1) $$1F1=[F^2.(\bar{T}^4+S+\bar{O})+\bar{S}.T^4.C.\bar{F}^2].Cp$$

$$0F1=[\bar{F}^2.(\bar{T}^4+\bar{S}+\bar{O})+S.T^4.C.F^2].Cp$$

(40F2) $$t_0F2=(Q.C+\bar{Q}.\bar{O}).Cp$$

From the foregoing description, it is apparent that the present invention provides a novel result-from-carry binary adder-subtracter which may be utilized with binary coded correction circuits, obviating the necessity of a separate true binary result generating network. It has been pointed out that the comparison flip-flop which is utilized also functions as a buffer stage and, therefore, it is not, in a practical circuit, an additional flip-flop stage. It has also been established that in using result-from-carry binary adder-subtracter, it is possible to simplify the correction circuits by performing the binary coded decimal corrections on a time-sharing basis such that the desired decimal carry signals and fourth binary digit of the decimal result are formed during a first time interval and the remainder of the binary digits of the decimal result are formed during a second time interval.

The invention itself having been described above, it is now convenient to describe in detail circuit components which may be used in mechanizing the invention. Although one specific form of flip-flop, "and" gate, "or" gate, and complementary circuit are described in detail herein, it is nevertheless to be understood that equivalent components may, if desired, be utilized to mechanize the invention.

Figures 5, 5A:
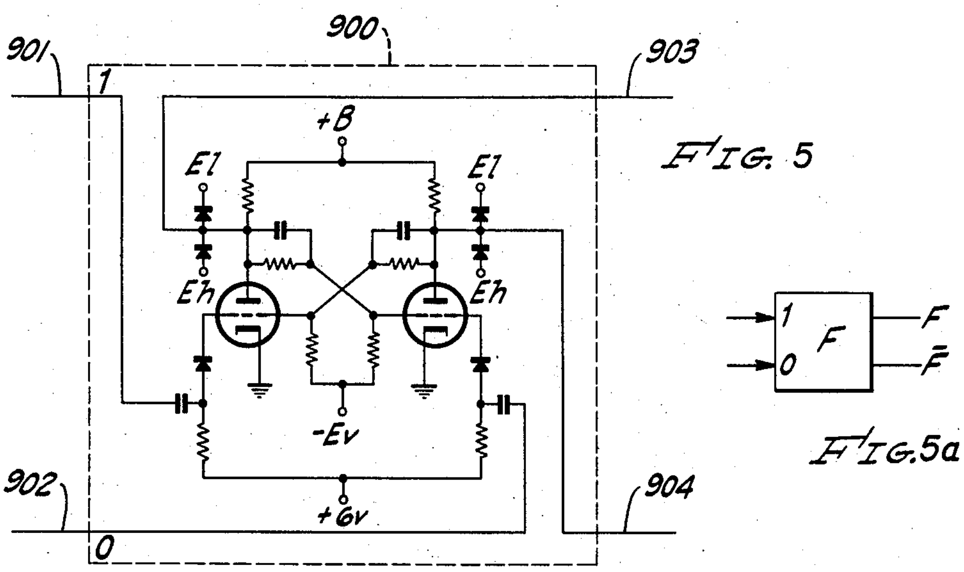
Fig. 5 is a schematic diagram of a flip-flop circuit.
Fig. 5a illustrates a symbolic representation of the flip-flop.

Reference is now made to Fig. 5 and to the schematic diagram of a flip-flop circuit which is shown therein. The flip-flop circuit is indicated by broken lines 900 and includes a 1-input circuit identified by lead 901, and a 0-input identified by lead 902, a primary output lead 903, and a complementary output lead 904. The flip-flop circuit of Fig. 5 is described in detail in U.S. Patent 2,644,887 entitled "Synchronizing Generator," issued July 7, 1953, to A. E. Wolfe, Jr. A detailed description herein of the construction and operation of flip-flop 900 is therefore deemed unnecessary.

Fig. 5*a* illustrates a method of symbolically representing the flip-flop circuit of Fig. 5. It may be noted that there is a direct correspondence between input leads 901 and 902 of Fig. 5 and the 1 and 0-input terminals indicated in Fig. 5*a*; and between the output leads 903 and 904 of Fig. 5 and the output terminals labeled F and $\bar{F}$ in Fig. 5*a*.

Logical Boolean algebraic equations have been employed in this description for the purpose of explaining the mechanization of "and" and "or" circuits for gates which correspond directly to the logical equations. Such circuits are well known in the art, typical circuits being described in detail in U.S. Patent 2,644,887 entitled "Synchronizing Generators," issued July 7, 1953, to A. E. Wolfe, Jr. Regardless of structural variations, the functional characteristics of these logical circuits remain substantially constant in the art, i.e., a logical "and" circuit produces an output signal only when signals are simultaneously applied to all the inputs and a logical "or" circuit produces an output signal when a signal is applied to at least one of its inputs. Logical gating circuits have been fully described, for example, in an article entitled "Diode Coincidence and Mixing Circuits in Digital Computers" by Tung Chang Chen in Proceedings of the Institute of Radio Engineers, May 1950, on pages 510–514.

Figure 6:
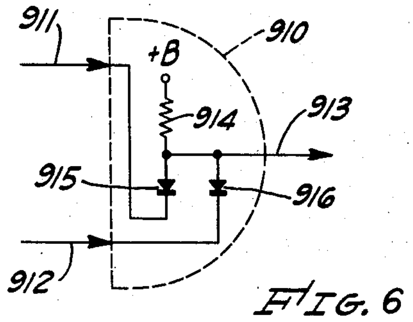
Fig. 6 is a schematic diagram of a logical "and" gating circuit.
Figure 6A:
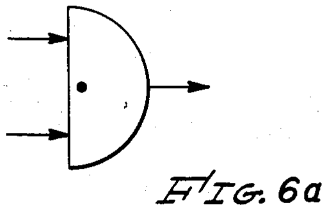
Fig. 6a shows a symbolic representation of the "and" circuit.

Reference is made to Fig. 6 wherein there is shown by way of example a typical logical "and" circuit 910 indicated by broken lines and having two inputs 911 and 912 coupled by diodes 915 and 916, respectively, to a common junction 913 which is connected by means of a resistor 914 to a B+ supply, the common junction 913 forming a single output. As indicated, input 911 is applied to the cathode of diode 915, and input 912 is applied to the cathode of diode 916, the anodes of both diodes 915 and 916 being commonly connected to the output terminal 913. The logical "and" circuit 910 functions typically in that a signal appears on output lead 913 only when signals are applied simultaneously to inputs 911 and 912. Where an additional input is required it may be added to the circuit of Fig. 6 by the addition of an additional diode connected to the common junction point 913 in a manner similar to that of diodes 915 and 916. In order to clearly illustrate the orientation of the input and output leads of a symbolically represented "and" circuit and the typical "and" circuit of Fig. 6, a symbolical representation of an "and" circuit is illustrated in Fig. 6*a*. It should be noted that the inputs and outputs associated with the circuit of Fig. 6 and the symbolically represented logical "and" circuit of Fig. 6*a* are similarly orientated.

Figure 7:
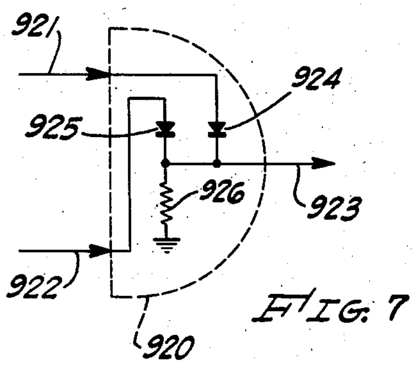
Fig. 7 is a schematic diagram of a logical "or" circuit and Fig. 7a is a symbolic representation of the "or" circuit.
Figure 7A:
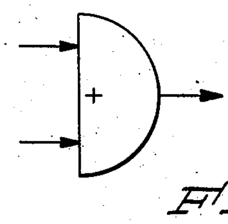

Reference is now made to Fig. 7 wherein there is illustrated a typical logical "or" circuit 920 indicated by broken lines and having two inputs 921 and 922 coupled by diodes 924 and 923, respectively, to a common junction 925 which is connected by means of a resistor 926 to ground, the common junction 925 forming the single output. As indicated in the figure, input 921 is applied to the anode of diode 924, and input 922 is applied to the anode of diode 923, the cathodes of both diodes 923 and 924 being commonly connected to the output terminal 925. The logical "or" circuit 920 functions typically in that a signal appears on output lead 925 when a signal is applied to either input 921 or input 922, or both. Where an additional input is required, it may be added to the circuit of Fig. 7 by the addition of an additional diode connected to the common junction point 925 in a manner similar to that of diodes 923 and 924. Again it should be noted that the inputs and outputs associated with the circuits of Fig. 7 and a symbolically represented logical "or" circuit of Fig. 1 are similarly orientated in Fig. 1. In Fig. 7*a* there is presented a symbolic representation of the logical "or" circuit illustrated in Fig. 7, wherein the inputs 921 and 922 and the single output 925 of Fig. 7 is provided with similarly orientated leads in Fig. 7*a*.

The operation and characteristics of the logical "and" circuit 910 of Fig. 6 and the logical "or" circuit 920 of Fig. 7 are fully described in detail in the above-mentioned Wolfe patent, therefore, further explanation of the circuits of Figs. 6 and 7 are not required here.

Figure 8:
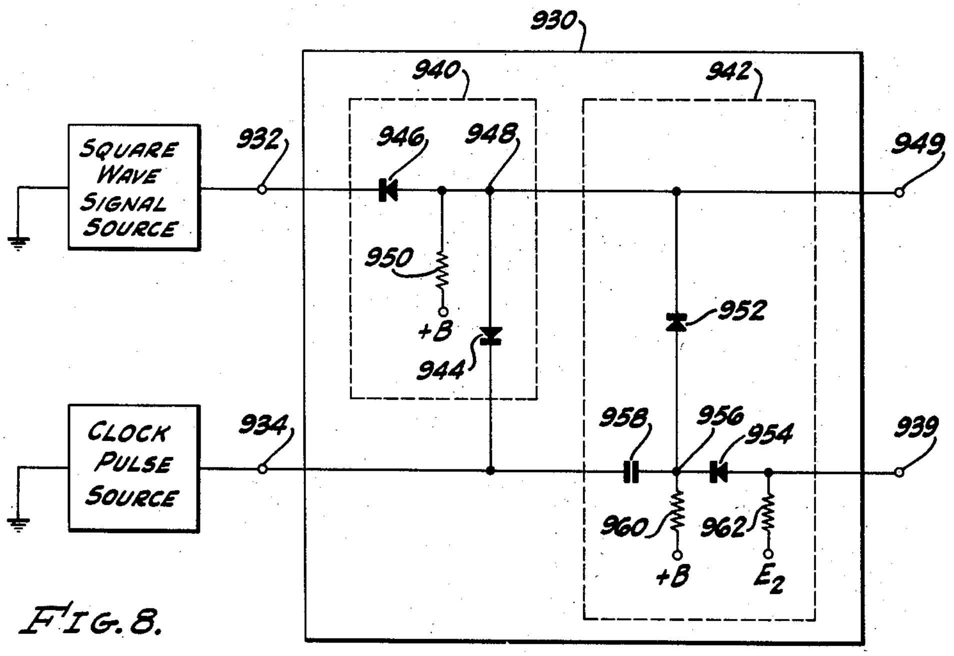
Fig. 8 is a schematic diagram of a complementary signal generating network suitable for use in mechanizing the invention.
Figures 8A, 8B:
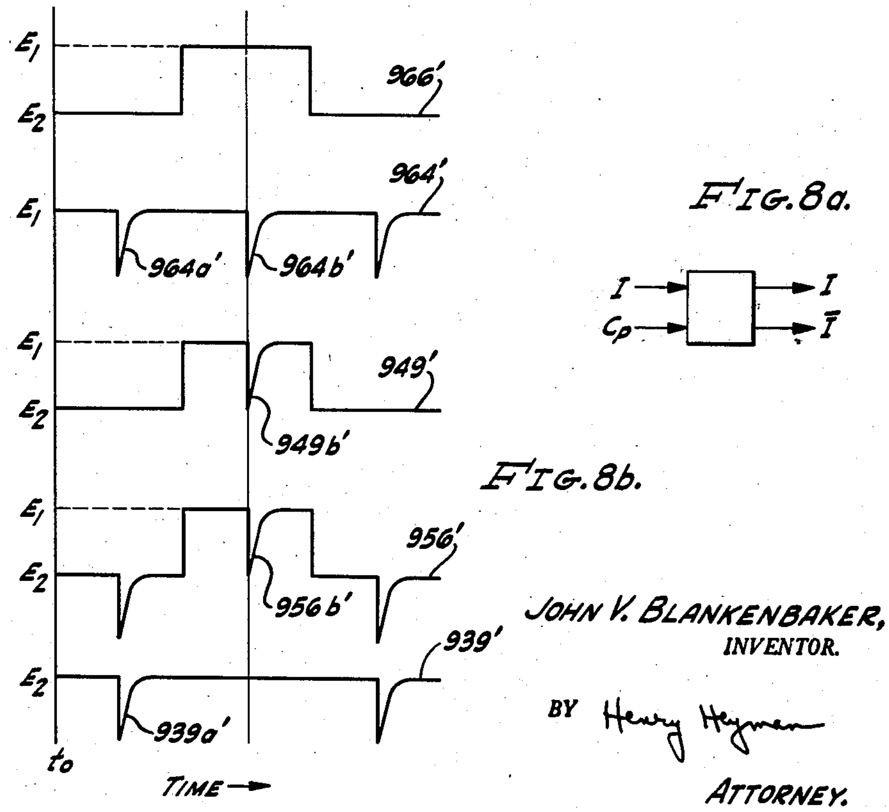
Fig. 8a shows a symbolic representation of the complement generator.
Fig. 8b shows wave shapes illustrating the operation of the complement generator of Fig. 8.

Reference is now made to Fig. 8 wherein there is shown a complementary signal generating network which may be utilized as any one of the complementer circuits *Co* of Figs. 1–4, and to Fig. 8*a* which shows a symbolic representation of the network of Fig. 8. In the circuit of Fig. 8, the complementary signal generator network 930 is responsive to binary or two-level voltage control signals applied at a first input terminal 932 for selectively gating or passing an electrical pulse or clock signal applied at a second input terminal 934 to produce two complementary electrical pulse output signals at a first output terminal 949 and a second output terminal 939, respectively.

Complementary signal generating network 930 includes first and second electronic gating circuits 940 and 942, respectively, responsive to different predetermined voltage levels of the applied control signal for selectively presenting the applied electrical pulse signal at output terminals 949 and 939, respectively. First gating circuit 940 includes a pair of unidirectional current devices, such as crystal diodes 944 and 946, the cathode of diode 944 being connected to input terminal 934 and the cathode of diode 946 being connected to control terminal 932. Diodes 944 and 946 have their anodes connected together at a common junction 948 which is connected to output terminal 949. Common junction 948 is also coupled to one terminal B+ of a source of biasing potential, not shown, by a biasing resistor 950, the other terminal of the source being grounded.

Second gating circuit 942 also includes a pair of serially connected unidirectional current devices, such as crystal diodes 952 and 954, interconnecting common junction 948 with output terminal 939, the cathode of diode 952 being connected to common junction 948 and the anode of diode 954 being connected to output terminal 939. The common junction 956 of diodes 952 and 954 is in turn coupled to injut terminal 934 by a capacitor 958 and to one terminal B+ of the source of biasing potential, not shown, by a biasing resistor 960. In a similar manner, diode 954 has its anode coupled to one terminal $E_2$ of a source of biasing potential, not shown, by a biasing resistor 962. The other terminal of each of the sources is connected to ground. The function of the biasing potentials at terminals B+ and $E_2$ and typical values thereof will be described in detail below. For reasons which will become more clearly understood later, however, it should be stated that the potential appearing at terminal $E_2$ is lower than the potential at terminal B+.

In operation, input terminal 934 is connected to a source 964 of negative electrical clock pulses *Cp* to be selectively passed, and control terminal 932 is connected to a variable potential control or binary signal source, such as a squarewave signal source 966 which controls the selectivity of gating circuits 940 and 942. Source 966 may be any suitable source of a signal having alternate relatively high and relatively low voltage levels, such as a conventional voltage state gating matrix.

Referring now to Fig. 8*b*, there is shown a composite diagram of the waveforms appearing at various points in the complementary signal generating network of Fig. 8. The control signal, generally designated 966', which is applied to control terminal 932 from source 966, includes alternate relatively low and high voltage levels $E_2$ and $E_1$, respectively, the voltage level $E_2$ corresponding substantially to the biasing potential at terminal $E_2$. The negative electrical pulse or clock signal *Cp*, generally designated 964', which is applied to input terminal 934 from source 964, has a steady state voltage level which is preferably substantially equal to potential $E_1$, the periodically recurring negative pulse excursions of signal 964' lowering the potential of the signal accordingly.

Assume now that signal 966' is initially at its low potential value of $E_2$, as shown at time $t_0$ in Fig. 8*b*. Under these conditions the signal, generally designated 949', appearing at common junction 948 will be at a voltage level substantially equal to level $E_2$ due to the clamping action of diode 946. In a similar manner, the signal, generally designated as 956' appearing at common junction 956, will have a potential value substantially equal to $E_2$ due to the clamping action of diode 952. Consequently, the potential difference across diode 954 in second gating circuit 942 is substantially zero volts, whereas diode 944 in first gating circuit 940 is back-biased by substantially the voltage differential between the voltage levels $E_1$ and $E_2$.

Consider now the behavior of complementary signal generating network 930 when signal 964' includes a first negative pulse **964*a'*, the pulse amplitude being equal to or less than the voltage differential between voltage levels $E_1$ and $E_2$. Since the amplitude of pulse 964*a'* is insufficient to drive the cathode of diode 944 below voltage level $E_2$, it is apparent that diode 944 will remain back-biased. Accordingly, diode 944 will not pass the negative pulse to common junction 948 and hence to output terminal 949**.

When negative pulse **964*a'* is applied to input terminal 934, the potential of common junction 956, heretofore clamped substantially at level $E_2$ by diode 952, will be lowered accordingly, due to the coupling action of capacitor 958. It is clear, of course, that diode 952 will be immediately back-biased for the duration of pulse 964*a'*, since its cathode is held substantially at level $E_2$ due to the clamping action of diode 946, whereas its anode will fall below potential $E_2$ by approximately the amplitude of pulse 964*a'*. It follows then, that pulse 964*a'* is inhibited from appearing at output terminal 949 by back-biased diodes 944 and 952**.

It is clear, however, that diode 954 is now front-biased by the application of pulse **964*a'* since the potential of common junction 956 and hence the cathode of diode 954 is driven below the voltage level $E_2$ by the magnitude of the applied pulse. Accordingly, negative pulse 964*a'* will be passed by diode 954 and will result in a corresponding negative pulse 939*a'* in the signal, generally designated 939', which appears at output terminal 939**.

Assume now that signal 966' swings to its relatively high level potential value $E_1$, and that signal 964' is at its steady state level $E_1$. Under these conditions, the potentials at common junctions 948 and 956 also swing to voltage level $E_1$ due to the clamping action of diodes 946 and 952, respectively. Consequently, the potential difference across diode 944 is first gating circuit 940 is substantially zero, whereas diode 954 in second gating circuit 942 is back-biased by substantially the voltage differential between the voltage levels $E_1$ and $E_2$.

Let us now assume that signal 964' includes a negative pulse **964*b'*, the amplitude of which is equal to or less than the voltage differential between voltage levels $E_1$ and $E_2$. It is immediately clear that diode 944 will be front-biased and will, therefore, pass pulse 964*b'* and produce a corresponding output pulse 949*b'* in signal 949' appearing at output terminal 949**.

Although pulse **964*b'* is also applied to common junction 956 by coupling capacitor 958, it will be noted that the pulse 956*b'* appearing in signal 956' does not lower the potential of common junction 956 below potential level $E_2$. Accordingly, diode 954 will remain back-biased and thereby inhibit the applied negative electrical pulse from appearing at output terminal 939**.

If signal 966' applied to control terminal 932 of complementary signal generating network 930 again swings to its low potential value of $E_2$ as illustrated in Fig. 8*b*, a negative pulse **964*b'* applied to input terminal 934 will again produce a corresponding negative pulse 939*c'* at output terminal 939 and will be inhibited from appearing in signal 949' at output terminal 949. It is clear, therefore, that complementary signal generating network 930 is responsive to the relatively high and relatively low potential levels of control signal 966' for selectively passing negative electrical pulses applied at input terminal 932 to produce two complementary output signals at output terminals 949 and 939, respectively. In other words, an applied electrical pulse signal will be presented at either output terminal 949 or at output terminal 939 depending upon whether control signal 966'** is at its relatively high potential value or its relatively low potential value, respectively.

As set forth above, diode 946 and resistor 950 are utilized for clamping common junction 948 at substantially the instantaneous voltage of control signal 966'. However, diode 946 also performs the additional function of inhibiting electrical pulses appearing at junction 948, such as pulse **949*b'* in signal 949', from being applied back into squarewave signal source 966. For example, when electrical pulse 964*b'* is applied at input terminal 934, the potential of common junction 948 drops below its clamped potential level $E_1$ by the voltage amplitude of pulse 949*b'*. Since the potential $E_1$ is being applied to the cathode of diode 946 at this time, diode 946 is back-biased for the duration of pulse 949*b'*, thereby effectively isolating source 966 from clock pulse source 964. The combination of diode 946 and resistor 950** may, therefore, be termed an isolating network.

It will be recognized by those skilled in the computer art that if square wave signal source 966 comprises a voltage state gating matrix having a conventional diode "and" gate output circuit, the isolating network including diode 946 and resistor 950 may be eliminated from complementary signal generating network 930. In other words, if squarewave signal source 966 includes an "and" gate output circuit, the function of diode 946 and resistor 950 may be performed by the output circuit of the source, and the isolating network may be excluded from complementary signal generating network 930.

The above described complementer or complementary signal generator is fully described and claimed in copending U.S. patent application, Serial No. 308,045, for "Complementary Signal Generating Network," by Daniel L. Curtis, filed September 5, 1952.

While all the embodiments herein have been described as adder-subtracter, it will be understood that the invention is generic as well to the subcombinations of result-from-carry adders or subtracters. In addition, it should be understood that a considerable number of variations in the algebraic definitions provided herein are possible and that each of the equations provided above must be considered as being generic to an entire class of equations which may be derived therefrom by well-known algebraic manipulations.

The term "matrix" is used in certain claims in this application. The term "matrix" is intended to indicate the different bases upon which number systems are predicated. For example, a binary system has a base of "2" and a decimal system has a base of "10." The claims using the term "matrix" are intended to cover the conversion from one numerical base to another.

What is claimed as new is:

1. An arithmetic unit for performing an operation of addition or subtraction upon binary-coded decimal numbers, represented by electrical input signals, by first producing a binary carry signal series indicating the true binary carries resulting in the operation and then forming the desired binary-coded decimal result series as a function of said binary carry signal series, said arithmetic unit comprising: first means, responsive to the input signals, for producing the binary carry signal series; second means responsive to the binary carry signals and the input signals for producing a comparison signal series, one comparison signal for each binary carry signal, each comparison signal representing the relationship between the associated binary carry digit and the corresponding binary result digit; and shifting and correcting register means responsive to said carry and comparison signals for producing the desired binary-coded decimal result series indicative of the result of the operation performed on the electrical input signals.

2. The arithmetic unit defined in claim 1 wherein said shifting and correcting register means includes means for combining the binary carry signals and the comparison signals to produce signals $Cd$ and $\bar{C}d$ indicating the decimal carry digits resulting from the arithmetic operation and wherein means are included to combine the binary carry signals, the comparison signals and the decimal carry signals to produce modified carry and comparison signals for use in obtaining the desired binary-coded decimal result.

3. The arithmetic unit defined in claim 2 wherein the shifting and correcting register means for producing the desired binary-coded decimal results are operative in first and second correction time intervals to convert the binary result signals into the binary-coded decimal result signals and wherein means are included during the first correction time interval to combine the binary carry signals and the comparison signals to obtain decimal carry signals $Cd$ and $\bar{C}d$ and wherein means are included to combine the binary carry signals and the comparison signals during the first correction time interval to obtain decimal comparison signals $Qd$ and $Qd_4$ and wherein means are included to combine the decimal carry signals and the decimal comparison signals and the binary result signals during the second correction time interval to convert the binary result signals into the desired binary-coded decimal result signals and wherein means are included to produce recurrent timing signals for indicating the first and second correction time intervals.

4. The arithmetic unit defined in claim 2 wherein means are included for providing successive clock pulses in the signal series and wherein means are responsive to the clock pulses for producing timing signals T and $\bar{T}$ on a recurrent basis during successive pluralities of clock pulses to control the times of converting the binary result into the binary-coded decimal result and wherein the shifting and correcting register means are responsive to the timing signals T as well as to the carry and comparison signals to obtain a conversion of the binary result signals into the desired binary coded decimal result series.

5. An arithmetic unit for performing operations of addition upon binary-coded decimal input numbers A and B, represented by corresponding series of electrical input signals A, $\bar{A}$; and B, $\bar{B}$, where the bar (‾) indicates the complement of a signal; said unit comprising: first means for producing binary carry signal series C and $\bar{C}$ indicating the true binary carries resulting in the addition; second means, responsive to signals A, $\bar{A}$, B, $\bar{B}$, C, and $\bar{C}$, for producing comparison signal series Q and $\bar{Q}$, said comparison signal series including a complementary pair of comparison signals for each complementary pair of binary carry signals C and $\bar{C}$, signals Q and $\bar{Q}$ representing the relationship between the associated binary carry signal and the corresponding true binary sum digit; and shifting and correcting register means, responsive to signals C, $\bar{C}$, Q, and $\bar{Q}$, for producing a signal series $Sd$ corresponding to the binary-coded decimal sum of the input numbers; said register means including first and second correction flip-flops F1 and F2 producing complementary output signals $F^1$, $\bar{F}^1$; and $F^2$, $\bar{F}^2$; and having input circuits 1F1, 0F1; and 1F2, 0F2, respectively, said register means also including a first electrical gating circuit responsive to signals $F^1$ and $\bar{F}^1$ for producing said signal series $Sd$, a second electrical gating circuit interconnecting said flip-flops, and a third electrical gating circuit interconnecting said input circuits 1F2, 0F2, to said first and second means.

6. The arithmetic unit defined in claim 5 wherein the binary carry signal means and said comparison signal means are interconnected in a particular relationship to produce a signal series $Sb^1$, $Sb^2$ and $Sb^3$ respectively representing the first, second and third digits of the binary sum of said input numbers and wherein binary-coded decimal corrections are performed in said register means during first and second correction time intervals and which further includes means for applying to said register means timing signal sets $T^3$, $\bar{T}^3$; and $T^4$, $\bar{T}^4$; signals $T^3$ and $T^4$ having 1-representing signals respectively when first and second binary result digits $Sb^1$ and $Sb^2$ corresponding to the true binary sum of a pair of decimal digits of said input numbers are in said register, and when the second and third binary result digits $Sb^2$ and $Sb^3$ of the binary result are in said register.

7. The arithmetic unit defined in claim 5 wherein all binary coded decimal corrections are performed during correction time intervals represented by pluralities of clock pulses $Cp$ and which further includes means responsive to the clock pulses $Cp$ for providing signals T during particular clock pulses of each time interval and for providing signals $\bar{T}$ during other clock signals of each time interval to obtain a repetitive pattern for the production of the signals T and $\bar{T}$, the signal $\bar{T}$ representing the complement of the signal T, and which further includes means responsive to the timing signals T and $\bar{T}$ and coupled to said second and third electrical gating circuits of said register means for applying the timing signals T and $\bar{T}$ to the second and third electrical gating circuits of said register means to obtain the production of signals representing particular digits of the decimal sum during the occurrence of the timing signals T.

8. The arithmetic unit defined in claim 7 wherein said shifting and correcting register means includes means for combining the comparison, carry and binary result signals to produce decimal carry signals C*d* and $\bar{C}d$ in accordance with the following logical equations:

$$Cd=T.C+T.\bar{Q}\ (F^2+F^1)$$
$$\bar{C}d=\bar{T}+\bar{C}.Q+\bar{C}.\bar{F}^2.\bar{F}^1$$

where the dot (.) indicates a logical "and" relationship and the plus (+) indicates a logical "or" relationship and the parentheses indicated an "and" relationship and the bar (‾) indicates the complement of a signal.

9. In an arithmetic unit for performing a mathematical operation of either addition or subtraction upon binary-coded decimal input numbers to form the corresponding binary-coded decimal result, the input numbers and the result being represented by electrical input and output signal series, respectively; binary result-from-carry circuit means comprising: carry signal generating means, responsive to the input signal series, for producing a binary carry signal series corresponding to the true binary carry digits resulting from the mathematical operation; means responsive to the binary carry signal series and the input signal series to obtain the production of a signal series representing the binary digits resulting from the binary combination of the input numbers and comparison signal generating means, responsive to said input signal series and said carry signal series and said binary result signal series, for producing a comparison signal series in accordance with the pattern of occurrence of the carry signals and the binary result signals.

10. In an arithmetic unit for performing a mathematical operation of either addition or subtraction upon input numbers digitally coded in a first matrix to represent a second matrix and for performing such mathematical operation to obtain an output number digitally coded in the first matrix to represent the second matrix and for providing electrical signal series to represent the input and output numbers, the combination including carry signal generating means responsive to the input signal series for producing a carry signal series corresponding to the carries resulting from the combination of the input numbers in the first matrix relationship; comparison signal generating means responsive to said input signal series and said carry signal series for producing a comparison signal series representing the relationship between corresponding carry signals and the first matrix result signals; and circuit means responsive to said carry signal series, and the comparison signal series and the input signal series to produce the electrical output signal series.

11. In an arithmetic unit for performing a mathematical operation of either addition or subtraction upon binary coded decimal input numbers to form the corresponding binary coded decimal result, the input numbers and the result being represented by electrical input and output signal series, respectively; the combination comprising: carry signal generating means, responsive to the input signal series, for producing a binary carry signal series corresponding to the true binary carries resulting from the arithmetical operation; comparison signal generating means, responsive to said input signal series and said binary carry signal series, for producing a comparison signal series, one comparison signal for each binary carry signal, each comparison signal representing the relationship between the associated binary carry digit and the corresponding true binary result; and converting circuit means, responsive to said binary carry signal series, the binary input signal series and said comparison signal series to produce electrical output signal series representing the binary coded decimal result.

12. The combination defined in claim 11 wherein the binary coded decimal result is the sum of the input numbers, the corresponding electrical input signal series being designated as $A_j$, $\bar{A}_j$ and $B_j$, $\bar{B}_j$ and the carry and comparison signal series being designated as $C_j$, $\bar{C}_j$ and $Q_j$, $\bar{Q}_j$ respectively, the *j* indicating the binary digit position in the corresponding signal series and the bar (‾) indicating the complement of a signal; said signal series $C_j$, $\bar{C}_j$ and $Q_j$, $\bar{Q}_j$ being produced in accordance with the passage of signals through circuitry constructed in accordance with the following algebraic relationships:

$$1C=A.B.Cp$$
$$0C=\bar{A}.\bar{B}.Cp$$
$$t_0Q=(A.B.C+\bar{A}.\bar{B}.\bar{C}).Cp$$

where the signal Cp is a sychronizing signal and where 1C and 0C represent input signals to a flip-flop C to respectively produce signals C and $\bar{C}$ and wherein $t_0Q$ indicates a setting function for triggering and maintaining the production of a Q signal by a flip-flop Q and wherein the dot (.) represents an "and" relationship and the plus sign (+) represents an "or" relationship and where the parentheses ( ) represent an "and" relationship.

13. The combination defining claim 11 wherein the binary coded decimal result is the difference of the input numbers, the corresponding electrical input signal series being designated as $A_j$, $\bar{A}_j$ and $B_j$, $\bar{B}_j$ and the carry and comparison signal series being designated as $C_j$, $\bar{C}_j$ and $Q_j$, $Q_j$ respectively, the *j* indicating the binary digit position in the corresponding signal series and the bar (‾) indicating the complement of a signal; said signal series $C_j$, $\bar{C}_j$ and $Q_j$, $\bar{Q}_j$ being produced in accordance with the passage of signals through circuitry constructed in accordance with the following algebraic relationships:

$$1C=\bar{A}.B.Cp$$
$$0C=A.\bar{B}.Cp$$
$$t_0Q=(A.B.C+\bar{A}.\bar{B}.\bar{C}+B.\bar{C}+\bar{B}.C).Cp$$

where the signal Cp is a synchronizing signal and where 1C and 0C represent input signals to a flip-flop C to respectively produce signals C and $\bar{C}$ and wherein $t_0Q$ indicates a setting function for triggering and maintaining the production of a Q signal by a flip-flop Q and wherein the dot (.) represents an "and" relationship and the plus sign (+) represents an "or" relationship and where the parentheses ( ) represent an "and" relationship.

14. The combination defined in claim 11 wherein the binary coded decimal result is the sum and difference of the input numbers in response to applied signals $\bar{S}$ and S respectively representing the operations of addition and subtraction, the corresponding electrical input signal series being designated as $A_j$, $\bar{A}_j$ and $B_j$, $\bar{B}_j$ and the carry and comparison signal series being designated as $C_j$, $\bar{C}_j$ and $Q_j$, $\bar{Q}_j$, respectively, the subscript *j* indicating the binary digit position in the corresponding signal series and the bar (‾) indicating the complement of a signal; said signal series $C_j$, $\bar{C}_j$ and $Q_j$, $\bar{Q}_j$ being produced in accordance with the passage of signals through circuitry constructed in accordance with the following algebraic relationships:

$$1C=(\bar{S}.A.B+S.\bar{A}.B).Cp$$
$$0C=(\bar{S}.\bar{A}.\bar{B}+S.A.\bar{B}).Cp$$
$$t_0Q=(A.B.C+\bar{A}.\bar{B}.\bar{C}+S.B.\bar{C}+S.\bar{B}.C)Cp$$

and where 1C and 0C represent input signals to a flip-flop C to respectively produce signals C and $\bar{C}$, and where the representation $t_0Q$ indicates a setting function for triggering and maintaining the production of a Q signal by a flip-flop Q and wherein the dot (.) represents an "and" relationship and the plus sign (+) represents an "or" relationship and where the parentheses ( ) represent an "and" relationship.

15. The combination defined in claim 11 wherein the input signal series are designated as $A_j$ and $B_j$ and wherein the carry and comparison signal series for the addition of $A_j$ and $B_j$ are respectively designated as $C_j^+$ and $Q_j^+$ and wherein the carry and comparison signal series for the subtraction of $B_j$ from $A_j$ are respectively designated as $C_j^-$ and $Q_j^-$ and wherein the subscript $j$ is used to designate the binary digit position in the corresponding series and the subscript $j-1$ is used to designate a delay from the previous digit position and wherein means are included to generate a signal $\bar{S}$ for addition and a signal S for subtraction and wherein the carry signal generating means are connected to the input signal means and the means for generating the signals S and $\bar{S}$ to produce signals in accordance with the logical equation:

$$C_j^{\pm}=B_j.C_{j-1}+\bar{S}.(A_j.C_{j-1}+A_j.B_{j-1})+S.(A_j.C_{j-1}+\bar{A}_j.B_{j-1})$$

and wherein the comparison signal generating means are connected to the input signal means and the carry signal generating means and the means for generating the signals S and $\bar{S}$ to produce signals in accordance with the logical equation $$Q_j^{\pm}=A_j.B_j.C_{j-1}+\bar{A}_j\bar{B}_j.\bar{C}_{j-1}+S.(B_j.\bar{C}_{j-1}+\bar{B}_j.C_{j-1})$$

where the dot (.) represents a logical "and" relationship and the plus (+) represents a logical "or" relationship and the bar (‾) over the signals represents a complementary state.

16. An arithmetic unit for performing operations of subtraction upon binary-coded decimal input numbers A and B, represented by corresponding series of electrical input signals A, $\bar{A}$; and B, $\bar{B}$, where the bar (‾) indicates the complement of a signal; said unit comprising: first means for producing binary carry signal series C and $\bar{C}$ indicating the true binary carries resulting in the subtraction; second means, responsive to signals A, $\bar{A}$, B, $\bar{B}$, C, and $\bar{C}$, for produing comparison signal series Q and $\bar{Q}$, said comparison signal series including a complementary pair of comparison signals for each complementary pair of binary carry signals C and $\bar{C}$, signals Q and $\bar{Q}$ representing the relationship between the associated binary carry signal and the corresponding binary difference digit; and shifting and correcting register means, responsive to signals C, $\bar{C}$, Q and $\bar{Q}$, for producing a signal series D*d* corresponding to the binary-coded decimal difference of the input numbers; said register means including first and second correction flip-flops F1 and F2 producing complementary output signals $F^1$, $\bar{F}^1$, and $F^2$, $\bar{F}^2$, and having input circuits 1F1, 0F1, and 1F2, 0F2, respectively, said register means also including a first electrical gating circuit responsive to signals $F^1$ and $\bar{F}^1$ for producing said signal series D*d*, a second electrical gating circuit interconnecting said flip-flops, and a third electrical gating circuit interconnecting said input circuits 1F2, 0F2, to said first and second means.

17. The arithmetic unit defined in claim 16, wherein all binary coded decimal corrections are performed during correction time intervals represented by pluralities of clock pulses *Cp* and which further includes means responsive to the clock pulses *Cp* for providing signals T during particular clock pulses *Cp* of each time interval and for providing signals $\bar{T}$ during other clock pulses *Cp* of each time interval to obtain a repetitive pattern for the production of the signals T and $\bar{T}$, the signal $\bar{T}$ representing the complement of the signal T, and which further includes means responsive to the timing signals T and $\bar{T}$ and coupled to said second and third gating circuits of the register means for applying the signals T and $\bar{T}$ to the second and third electrical gating circuits of the register means to obtain the production of signals representing particular digits of the decimal difference during the occurrence of the timing signals T.

18. The arithmetic unit defined in claim 17 wherein said first, second and third electrical gating circuits are constructed to produce signals in accordance with the logical equations:

$$Dd=\bar{T}.F^1+\bar{C}.F^1+T.C.\bar{F}^1$$
$$1F1=F^2.Cp$$
$$0F1=(\bar{T}.\bar{F}^2+T.C.F^2+\bar{C}.F^2).Cp$$
$$1F2=(\bar{T}.Q.C+\bar{Q}.\bar{C}).Cp$$
$$0F2=[Q.\bar{C}+\bar{Q}.C+T.(\bar{Q}+\bar{C}+\bar{F}^1)].Cp$$

where the equation D*d* represents the construction of the first electrical gating circuit and where the equations 1F1 and 0F1 represent the construction of the second electrical gating circuit and where the equations 1F2 and 0F2 represent the construction of the third electrical gating circuit and where the dot (.) and the parentheses ( ) represent "and" relationships and where the plus (+) sign represents an "or" relationship and where the bar (‾) represents the complement of a signal and where the equations 1F1 and 0F1 represents the introduction of input signals to the first flip-flop F1 to obtain the respective production of output signals $F^1$ and $\bar{F}^1$ and where the equations 1F2 and 0F2 represent the introduction of input signals to the second flip-flop F2 to obtain the respective production of output signals $F^2$ and $\bar{F}^2$.

19. The arithmetic unit defined in claim 16 wherein means are provided for producing clock pulses *Cp* and wherein means are responsive to the clock pulses *Cp* for producing first timing signals $T^3$ and $\bar{T}^3$ on a recurrent basis during successive pluralities of clock pulses to represent first correction time intervals and wherein means are responsive to the clock pulses *Cp* for producing second timing signals $T^4$ and $\bar{T}^4$ on a recurrent basis during successive pluralities of clock pulses to represent second correction time intervals and wherein the first and second timing means are inter-related to obtain the production of each timing signal $T^4$ a particular number of clock pulses after each timing signal $T^3$ and wherein the first timing signals are introduced to the binary carry signal means and the comparison signal means to control the operation of these means and wherein the second timing signals are introduced to the first and second electrical gating circuits in the register means to control the operation of these gating circuits.

20. An arithmetic unit for performing arithmetic operations of addition and subtraction in response to complementary operation sign signals $\bar{S}$ and S, respectively, upon binary-coded decimal input numbers A and B, represented by corresponding series of complementary electrical input signals $A_j$, $\bar{A}_j$; and $B_j$, $\bar{B}_j$, the subscript $j$ indicating the binary digit positions and the bar (‾) indicating the complement of a signal; said unit comprising: carry signal generating means, responsive to input signal series $A_j$, $\bar{A}_j$, and $B_j$, $\bar{B}_j$ for producing a binary carry signal series $C_{j-1}\pm$ and $\bar{C}_{j-1}\pm$ corresponding to the binary carries and complements resulting from the operation, where the subscript *j—1* indicates a carry signal generated in response to the input signals $A_{j-1}$, $\bar{A}_{j-1}$, and $B_{j-1}$, $\bar{B}_{j-1}$ one digit position prior to $A_j$, $\bar{A}_j$ and $B_j$, $\bar{B}_j$ and where the subscript (±) indicates that the signal relates to either addition or subtraction; comparison signal generating means, responsive to signals $A_j$, $\bar{A}_j$; $B_j$, $\bar{B}_j$; and $C_{j-1}\pm$, $\bar{C}_{j-1}\pm$; for producing comparison signal series $Q_j\pm$ and $\bar{Q}_j\pm$, means responsive to signals $C_{j-1}\pm$, $\bar{C}_{j-1}\pm$, $Q_{j-1}\pm$, $\bar{Q}_{j-1}\pm$ for combining the binary carry signals $C_{j-1}\pm$ and $\bar{C}_{j-1}\pm$ and the comparison signals $Q_{j-1}\pm$ and $Q_j\pm$ to produce signals representing a corresponding binary result digit $R_j\pm$, $\bar{R}_j\pm$ indicating the arithmetic combination of $A_j$, $\bar{A}_j$, and $B_j$, $\bar{B}_j$, and $C_{j-1}\pm$, $\bar{C}_{j-1}\pm$; and shifting and correcting register means, responsive to signals $R_j\pm$, $\bar{R}_j\pm$, $C_{j-1}\pm$, $\bar{C}_{j-1}\pm$, $Q_j\pm$, and $\bar{Q}_j\pm$ for producing a signal series R$d$ corresponding to the binary-coded decimal result of the operation.

21. The arithmetic unit defined in claim 20 wherein said shifting and correcting register means includes first and second storage means F1 and F2 producing complementary output signals $F^1$, $\bar{F}^1$ and $F^2$, $\bar{F}^2$; said register further including a first electrical gating circuit responsive to gating signals $F^1$, $\bar{F}^1$ for producing signal series R$d$ representing the binary-coded decimal result, a second electrical gating circuit interconnecting said flip-flops, and a third electrical gating circuit coupling said flip-flops to said carry signal generating means and said comparison signal generating means.

22. The arithmetic unit defined in claim 21 wherein means are included to provide clock signals $Cp$ and wherein means are included for producing timing signals T and $\bar{T}$ on a recurrent basis and wherein means are included to generate a signal $\bar{S}$ for addition and a signal S for subtraction and wherein the carry signal generating means includes a flip-flop C having input circuits 1C and 0C for respectively receiving input signals to trigger the flip-flop to the states of operation C and $\bar{C}$ corresponding to signals $C_{j-1}$ and $\bar{C}_{j-1}$ ± and wherein said comparison signal generating means includes a flip-flop Q having input circuits 1Q and 0Q for receiving signals to trigger the flip-flop to states of operation Q and $\bar{Q}$ corresponding to signals $Q_{j-1}$ ± and $\bar{Q}_{j-1}$ and wherein the C flip-flop is connected to receive input signals for the triggering of the flip-flop in accordance with the logical equations $$1C=(\bar{S}.A.B+\bar{S}.T.\bar{Q}.F^2.A+\bar{S}.T.\bar{Q}.F^2.B+\bar{S}.T.\bar{Q}.F^1.A+\bar{S}.T.\bar{Q}.F^1.B+S.\bar{A}.B).Cp$$

$$0C=(\bar{S}.\bar{A}.\bar{B}+S.\bar{A}.B).Cp$$

and wherein the Q flip-flop is connected to receive signals for the triggering of the flip-flop in accordance with the following logical equations:

$$T^0Q=(\bar{T}.\bar{A}.\bar{B}.\bar{C}+Q.\bar{A}.\bar{B}.C+\bar{F}^2.\bar{F}^1.\bar{A}.\bar{B}.\bar{C}+A.B+\bar{Q}.F^2+A.B.T.\bar{Q}.F^1+A.B.C+S.B.\bar{C}.+S.\bar{B}.C).Cp$$

and wherein the first, second and third electrical gating circuits are connected to produce signals in accordance with the logical equations:

$$Rd=T.C.\bar{F}^1+T.\bar{Q}.F^2.F^1+\bar{T}.F^1+Q.F^1$$

$$1F1=(F^2.\bar{S}.+F^2.\bar{T}+F^2.Q+S.T.C).Cp$$

$$0F1=(\bar{F}^2.S+\bar{F}^2.\bar{T}+\bar{F}^2.C+\bar{S}.T.C.F^2).Cp$$

$$T_0F^2=(Q.C.\bar{T}+Q.C.S.F^2.F^1+\bar{Q}.\bar{C}.\bar{T}+\bar{Q}.\bar{C}.\bar{S}.\bar{F}^2.\bar{F}^1+F^2.T.\bar{S}.C.F^1+\bar{F}^2.S.T.\bar{Q}).Cp$$

and where the first electrical gating circuit is constructed to produce the signals R$d$ and where the second electrical gating circuit is constructed to produce the signals 1F1 and 0F1 and where the third electrical gating circuit is constructed to produce the signals $T_0F_2$ and where the equations 1F1 and 0F1 represent the introduction of signals to the first storage means to obtain the respective production of the signals $F^1$ and $\bar{F}^1$ and where the equation $T_0F_2$ indicates a setting function for triggering and maintaining the production an $F^2$ signal by the second storage means and where the equations 1C1 and 0C1 represent the introduction of signals to the carry signal generating means to obtain the respective production of the signals $C_1$ and $\bar{C}_1$ and where the equation $T_0Q$ indicates a setting function for triggering and maintaining the production of a Q signal by the comparison signal generating means and where the dot (.) and the parentheses ( ) indicate "and" relationships and the plus sign (+) indicates an "or" relationship and where the bar (‾) indicates the complement of a signal.

23. The arithmetic unit defined in claim 21 wherein means are included to provide clock signals $Cp$ and wherein means are included to generate a signal $\bar{S}$ for addition and a signal S for subtraction and wherein the carry signal generating means are connected to the input signal means and the means for generating the signals S and $\bar{S}$ to receive signals at terminals 1C and 0C and to produce signals C and $\bar{C}$ in accordance with the following logical relationships:

$$1C=(\bar{S}.A.B+Cd.(A+B)+S.\bar{A}.B).Cp$$

$$0C=(\bar{S}.\bar{A}.\bar{B}+S.\bar{A}.B).Cp$$

and wherein the comparison signal generating means are connected to the input signal means and the carry signal generating means and the means for generating the signals S and $\bar{S}$ to produce signals in accordance with the logical equations:

$$t_0Q=\overline{Cd}.\bar{A}.\bar{B}.\bar{C}+A.B.(Cd+C)+S.(B.\bar{C}+\bar{B}.C).Cp$$

and wherein the storage means are included to produce signals F1 and $\bar{F}$1 and signals F2 and $\bar{F}$2 representing the binary result signals before the decimal correction and representing the binary-coded decimal result signals after the decimal correction and wherein means are included for generating timing signals T and $\bar{T}$ on a recurrent basis to control the conversion of the binary result signals to the binary-coded decimal result signals and wherein means are included for combining the carry signals, the comparison signals and the storage signals to produce decimal carry signals $Cd$ and $\bar{C}d$ in accordance with the logical equations:

$$Cd=T.C.+\bar{Q}.(F^2+F^1)$$

$$\overline{Cd}=\bar{T}+\bar{C}.Q+\bar{C}.\bar{F}^2\bar{F}^1$$

where the dot (.) represents an "and" relationship and the plus (+) represents an "or" relationship and wherein $t_0$Q indicates a setting function controlling the setting or triggering of Q to the true state of operation and where the parentheses ( ) indicates an "and" relationship and the bar (‾) indicates the complement of a signal.

24. The arithmetic unit defined in claim 23 wherein said first, second and third electrical gating circuits are constructed to produce signals in accordance with the logical equations:

$$Rd=Cd.\bar{F}^1+\overline{Cd}.F^1$$

$$1F1=(\bar{C}\bar{d}.F^2+\bar{S}.Cd.\bar{F}^2+S.F^2).Cp$$

$$0F1=(\bar{S}\bar{F}^2+\overline{Cd}.\bar{F}^2+S.Cd.F^2).Cp$$

$$1F2=[\overline{Cd}.(Q.C+\bar{Q}.\bar{C})+\bar{S}.Cd.(\bar{Q}.C+Q.\bar{C}).F^1].Cp$$

$$0F2=[\overline{Cd}.(Q.\bar{C}+\bar{Q}.C)+\bar{S}.Cd(Q.C+\bar{Q}.\bar{C})+S.(\bar{Q}.C+Q.\bar{C})+S.Cd.\bar{F}^1].Cp$$

and wherein the first electrical gating circuit is constructed to produce signals in accordance with the equation R$d$ and wherein the second electrical gating circuit is constructed to produce signals in accordance with the equations 1F1 and 0F1 and wherein the third electrical gating circuit is constructed to produce signals in accordance with the equations 1F2 and 0F2 and wherein the equations 1F1 and 0F1 represent the introduction of signals to the storage means F1 to obtain the respective production of output signals $F^1$ and $\bar{F}^1$ and where the equations 1F2 and 0F2 represent the introduction of signals to the storage means F2 to obtain the respective production of output signals $F^2$ and $\bar{F}^2$.

25. The arithmetic unit defined in claim 21 wherein means are included to produce clock signals $Cp$ and wherein means are responsive to the clock signals to produce first correction signals $T^3$ and $\bar{T}^3$ and second correctional signals $T^4$ and $\bar{T}^4$ on a recurrent basis during successive pluralities of clock pulses $Cp$ and wherein the timing signal means are connected to produce the correction signal $T^3$ during particular clock pulses in the successive pluralities and wherein the timing signal means are connected to produce the timing signal $T^4$ at a particular clock pulse following the production of the timing signal $T^3$ in each successive plurality of clock pulses and wherein means are responsive to the binary carry signals C and $\bar{C}$ and the comparison signals Q and $\bar{Q}$ and the correction signals $T^3$ and $\bar{T}^3$ to produce decimal carry signals $Cd$ and $\overline{Cd}$ and decimal comparison signals $Qd^4$ and $\overline{Qd^4}$ and wherein means are responsive to the decimal carry signals $Cd$ and $\overline{Cd}$ and the decimal comparison signals $Qd^4$ and $\overline{Qd^4}$ and the correction signals $T^4$ and $\bar{T}^4$ to obtain the production of the binary results signals $Rd$.

26. The arithmetic unit defined in claim 25 wherein said carry signal generating means and said comparison signal generating means are responsive to the input signals A, $\bar{A}$, and B, $\bar{B}$ and to the sign signals S, $\bar{S}$ and to the timing correction signals $T^3$ and $\bar{T}^3$ and to the carry signals C, $\bar{C}$ and to the comparison signals Q, $\bar{Q}$ and to the clock signals $Cp$ and to the register signals $F^2$ and $\bar{F}^2$ to produce signals in accordance with the logical functions:

$$1C=[\bar{S}.T^3.(A+B).(F^2+\bar{Q})+\bar{S}.A.B+S.\bar{A}.B].Cp$$
$$0C=[\bar{B}.(S.A+\bar{S}.\bar{A}.\bar{Q}.\bar{F}^2+\bar{S}.\bar{A}.\bar{T}^3].Cp$$
$$t_0Q=[\bar{A}.\bar{B}.\bar{C}+A.B.C+T^3.A.(B+C).(S+F^2)+F^2.T^3.(\bar{S}.B.C+S.B.\bar{Q}+S.\bar{B}.Q)].Cp$$

and wherein said first, second and third electrical gating circuits are connected to produce signals in accordance with the logical equations:

$$Rd=\bar{T}^4.F^1+T^4.C.\bar{F}^1+\bar{C}.F^1$$
$$1F1=[F^2.(\bar{T}^4+S+\bar{C})+\bar{S}.T^4.C.\bar{F}^2].Cp$$
$$0F1=[\bar{F}^2.(\bar{T}^4+\bar{S}+\bar{C})+S.T^4.C.F^2].Cp$$
$$T_0F^2=(Q.C+\bar{Q}.\bar{C}).Cp$$

where the dot (.) and the parentheses ( ) indicate "and" relationships and the plus sign (+) indicates an "or" relationship and $t_0$Q and $t_0F^2$, respectively indicating setting functions controlling the setting or triggering of the comparison signal generating means to the Q state and the $F^2$ storage means to the $F^2$ state and where the equations 1F1 and 0F1 represent the introduction of signals to the storage means F1 to obtain the respective production of output signals $F^1$ and $\bar{F}^1$ and where the equations 1C1 and 0C1 represent the introduction of signals to the carry signal generating means to obtain the respective production of output signals C and $\bar{C}$ and where the bar (¯) indicates the complement of a signal and wherein the first electrical gating circuit is constructed to produce signals in accordance with the equation R$d$ and where the second electrical gating circuit is constructed to produce signals in accordance with the equations 1F1 and 0F1 and where the third electrical gating circuit is constructed to produce signals in accordance with the equation $T_0$F2.

References Cited in the file of this patent

UNITED STATES PATENTS

| | | |
|---|---|---|
| 2,775,402 | Weiss | Dec. 25, 1956 |
| 2,823,855 | Nelson | Feb. 18, 1958 |

FOREIGN PATENTS

| | | |
|---|---|---|
| 1,043,321 | France | June 10, 1953 |
| 674,326 | Great Britain | June 25, 1952 |
| 678,427 | Great Britain | Sept. 3, 1952 |

OTHER REFERENCES

High Speed Computing Devices, by Engineering Research Associates, McGraw-Hill, 1950, pp. 289–293.

UNITED STATES PATENT OFFICE
Certificate of Correction

Patent No. 2,892,587 June 30, 1959

John Virgil Blankenbaker

It is hereby certified that error appears in the printed specification of the above numbered patent requiring correction and that the said Letters Patent should read as corrected below.

Column 36, line 31, for "$Q_j$", second occurrence, read —$\overline{Q}_j$—; column 37, line 18, for "$S.(A_j.C_{j-1}+\overline{A}_j.B_{j-1})$" read —$S.(\overline{A}_j.C_{j-1}+\overline{A}_j.B_{j-1})$—; column 39, line 27, after "$\overline{Q}_{j-1}$" insert —±—.

Signed and sealed this 26th day of April 1960.

[SEAL]

Attest:
KARL H. AXLINE,
*Attesting Officer.*

ROBERT C. WATSON,
*Commissioner of Patents.*